US012797759B2

(12) United States Patent
Kiaghadi et al.

(10) Patent No.: US 12,797,759 B2
(45) Date of Patent: Nov. 17, 2026

(54) PLUSH TOY WITH ARRAY OF TEXTILE-BASED SENSORS FOR INTERACTION DETECTION

(71) Applicant: University of Massachusetts, Boston, MA (US)

(72) Inventors: Ali Kiaghadi, Amherst, MA (US); Jin Huang, Sunderland, MA (US); Seyedeh Zohreh Homayounfar, Amherst, MA (US); Deepak Ganesan, Amherst, MA (US); Trisha L. Andrew, Hadley, MA (US)

(73) Assignee: University of Massachusetts, Westborough, MA (US)

( * ) Notice: Subject to any disclaimer, the term of this patent is extended or adjusted under 35 U.S.C. 154(b) by 585 days.

(21) Appl. No.: 18/324,540

(22) Filed: May 26, 2023

(65) Prior Publication Data

US 2023/0381677 A1 Nov. 30, 2023

Related U.S. Application Data

(60) Provisional application No. 63/365,392, filed on May 26, 2022.

(51) Int. Cl.

| | |
|---|---|
| ***A63H 3/02*** | (2006.01) |
| ***A63H 3/36*** | (2006.01) |
| ***A63H 33/26*** | (2006.01) |
| ***G06N 3/0464*** | (2023.01) |

(52) U.S. Cl.

CPC ................. *A63H 3/02* (2013.01); *A63H 3/36* (2013.01); *A63H 33/26* (2013.01); *G06N 3/0464* (2023.01); *A63H 2200/00* (2013.01)

(58) Field of Classification Search

None

See application file for complete search history.

(56) References Cited

U.S. PATENT DOCUMENTS

| | | | | |
|---|---|---|---|---|
| 4,028,276 A * | 6/1977 | Harden | ................ | H01C 10/106 252/511 |
| 6,053,797 A * | 4/2000 | Tsang | ........................ | A63H 3/28 446/297 |
| 6,544,098 B1 * | 4/2003 | Hampton | ................. | A63H 3/28 446/298 |

(Continued)

OTHER PUBLICATIONS

"PlushPal: Storytelling with Interactive Plush Toys and Machine Learning" (Tseng et al., published Jun. 2021 in IDC '21 Proceedings), URL: <https://tifftseng.com/papers/plushpal.pdf> (Year: 2021).*

(Continued)

*Primary Examiner* — Seng H Lim

(74) *Attorney, Agent, or Firm* — Schwegman Lundberg & Woessner, P.A.

(57) ABSTRACT

A plush toy system comprises a plush toy body with an outer fabric layer, wherein the outer fabric layer forms an interactive surface engageable by a user, an array of textile-based pressure sensors coupled to the plush toy body proximate to the outer fabric layer, and sensor conditioning circuits coupled to the plush toy, the sensor conditioning circuits being configured to interpret signals from the textile-based pressure sensors to identify interaction between the user and the interactive surface.

19 Claims, 10 Drawing Sheets

(56) References Cited

U.S. PATENT DOCUMENTS

| | | | | |
|---|---|---|---|---|
| 8,636,558 | B2 * | 1/2014 | Eyzaguirre | G09B 5/06 446/330 |
| 8,926,393 | B2 * | 1/2015 | Morley | G01L 1/205 446/175 |
| 9,573,070 | B2 * | 2/2017 | Morley | G01L 1/205 |
| 2004/0180603 | A1 * | 9/2004 | Barri | A63H 5/00 446/175 |
| 2010/0197411 | A1 * | 8/2010 | Eyzaguirre | G09B 5/06 463/43 |
| 2011/0117810 | A1 * | 5/2011 | Morley | G01L 1/205 446/369 |
| 2012/0234105 | A1 * | 9/2012 | Taylor | G01N 3/08 73/862.046 |
| 2014/0073220 | A1 * | 3/2014 | Morley | A63H 3/20 446/369 |
| 2014/0256213 | A1 * | 9/2014 | Copeland | A63H 3/28 446/268 |
| 2015/0087198 | A1 * | 3/2015 | Morley | A63H 3/28 446/330 |
| 2016/0029963 | A1 * | 2/2016 | Hyde | A61B 7/003 600/300 |
| 2019/0176046 | A1 * | 6/2019 | Sutton | H03K 17/9625 |
| 2019/0230745 | A1 | 7/2019 | Andrew et al. | |
| 2022/0188621 | A1 * | 6/2022 | Narayanan | G06N 3/094 |

OTHER PUBLICATIONS

Altman, N.S, "An introduction to kernel and nearest-neighbor nonparametric regression", The American Statistician, vol. 46, No. 3, pp. 175-185 Feb. 1992., https: doi.org 10.1080 00031305.1992. 10475879, (Feb. 1992), 12 pgs.

Chen, "XGBoost: A scalable tree boosting system", Proceedings of the 22nd ACM SIGKDD International Conference on Knowledge Discovery and Data Mining, pp. 785-794 Aug. 2016., https: doi.org 10.1145 2939672.2939785, (Aug. 2016), 10 pgs.

Pal, M., "Random forest classifier for remote sensing classification", International Journal of Remote Sensing, vol. 26, Issue 1, p. 217-22 (2005)., https: doi.org 10.1080 01431160412331269698, (2005), 16 pgs.

Rumelhart, David, "Learning internal representations by error propagation", Technical Report, Univ. California San Diego Inst. for Cognitive Science, Sep. 1985., https: apps.dtic.mil dtic tr fulltext u2 a164453, (Sep. 1985), 49 pgs.

* cited by examiner

PLUSH TOY WITH ARRAY OF TEXTILE-BASED SENSORS FOR INTERACTION DETECTION

CROSS-REFERENCE TO RELATED APPLICATION

This application claims priority under 35 U.S.C. § 119(e) to U.S. Provisional Application Ser. No. 63/365,392, filed on May 26, 2022, entitled "PLUSH TOY WITH ARRAY OF TEXTILE-BASED SENSORS FOR INTERACTION DETECTION," the disclosure of which is incorporated herein by reference in its entirety.

STATEMENT REGARDING FEDERALLY SPONSORED RESEARCH OR DEVELOPMENT

This invention was made with Government support under grant number CNS-1763524 awarded by the National Science Foundation (NSF). The U.S. Government has certain rights in this invention.

BACKGROUND

Stuffed or plush toys can play an important role in a child's cognitive, physical and emotional development. Stuffed toys can also help to build social skills through pretend play and role playing. For example, when a child grooms or feeds a stuffed toy, he or she mimics everyday interactions, which can then transition into the wider social world. Through the process of caring for a stuffed toy, the child can also build empathy and kindness. Such interactions also play an important role in language skills since children act out stories and scenarios with their toy.

Recently, toys have been developed that include sensors to detect interaction between a user and the toy. These types of toys, often referred to as "smart toys," can be useful for parents and experts to observe and understand how a child is developing in their natural environment. However, there have been challenges with incorporating sensing elements into smart toys. For example, typically sensing elements and other interactive elements have been rigid, which change the nature of interaction and diminish the appeal of the plush toy because the sensors and actuators need to be placed near the surface of the toy, which can cause the toy to lose its soft feel and touch. As a result, the toys may not be as desirable for children who are drawn to softer and more squishy plush toys. As a compromise, smart toy manufacturers are typically forced to place only a small number of sensors in the toy, which diminishes the ability of the smart toy to measure fine-grained interaction at different locations of the toy. Current iterations of commercial smart toys mainly rely on binary pressure detection acting as an input switch or microphones for detecting a child's voice. These approaches are insufficient for detecting children's interaction with toys.

SUMMARY

The present disclosure describes a plush toy that incorporates an array of textile-based pressure sensors that can be located beneath an outer fabric layer of the plush toy. The textile-based sensors can maintain a natural and flexible feel of fabric such that even at the locations of the sensors the toy can maintain a plush and soft feel while still allowing for dense spatial sensing coverage of the toy for more robust detection of interaction between a user and the toy.

The present disclosure also describes hardware and software in addition to the sensor array for acquisition of interaction data that is configured for reduced or minimized energy load associated with sampling the large number of channels associated with the large array of sensors.

The present disclosure also describes a machine learning model configured for optimized power consumption and computation configured for local or remote processing of signal data from the sensor array.

BRIEF DESCRIPTION OF THE DRAWINGS

The drawings illustrate generally, by way of example, but not by way of limitation, various embodiments discussed in the present document.

DETAILED DESCRIPTION

Figure 1:
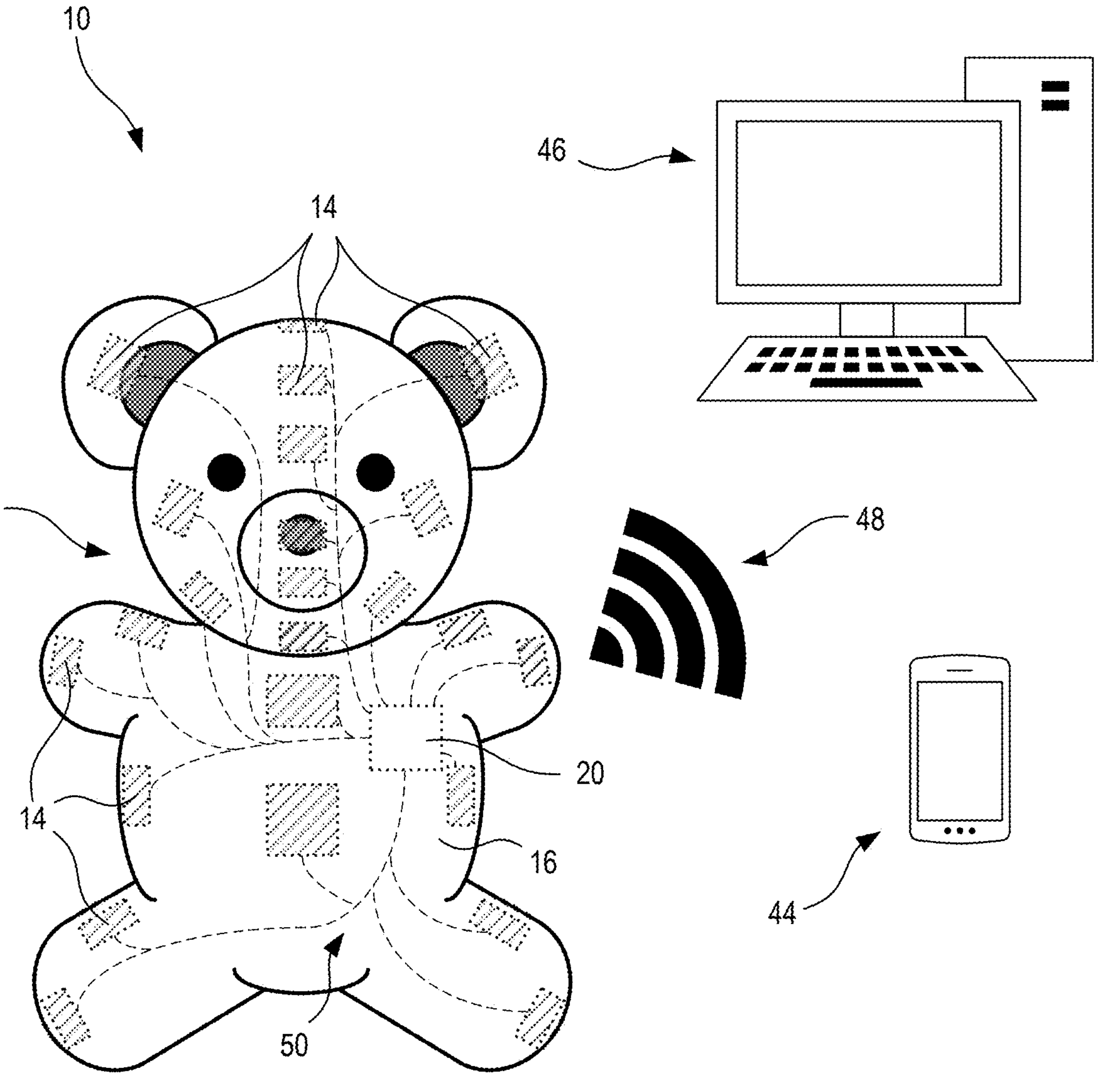
FIG. 1 is a conceptual diagram of an example plush object that can include an array of a plurality of the textile-based pressure sensors of FIG. 1.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The example embodiments may be combined, other embodiments may be utilized, or structural, and logical changes may be made without departing from the scope of the present invention. While the disclosed subject matter will be described in conjunction with the enumerated claims, it will be understood that the exemplified subject matter is not intended to limit the claims to the disclosed subject matter. The following detailed description is, therefore, not to be taken in a limiting sense, and the scope of the present invention is defined by the appended claims and their equivalents.

References in the specification to "one embodiment", "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be interpreted to include not only the explicitly recited concentration of about 0.1 wt. % to about 5 wt. %, but also the individual concentrations (e.g., 1%, 2%, 3%, and 4%) and the sub-ranges (e.g., 0.1% to 0.5%, 1.1% to 2.2%, and 3.3% to 4.4%) within the indicated range. The statement "about X to Y" has the same meaning as "about X to about Y,"" unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. Unless indicated otherwise, the statement "at least one of" when referring to a listed group is used to mean one or any combination of two or more of the members of the group. For example, the statement "at least one of A, B, and C" can have the same meaning as "A; B; C; A and B; A and C; B and C; or A, B, and C," or the statement "at least one of D, E, F, and G" can have the same meaning as "D; E; F; G; D and E; D and F; D and G; E and F; E and G: F and G; D, E, and F; D, E, and G; D, F, and G; E, F, and G; or D, E, F, and G."

In the methods described herein, the steps can be carried out in any order without departing from the principles of the invention, except when a temporal or operational sequence is explicitly recited. Furthermore, specified steps can be carried out concurrently unless explicit language recites that they be carried out separately. For example, a recited act of doing X and a recited act of doing Y can be conducted simultaneously within a single operation, and the resulting process will fall within the literal scope of the process. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E (including with one or more steps being performed concurrent with step A or Step E), and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, within 1%, within 0.5%, within 0.1%, within 0.05%, within 0.01%, within 0.005%, or within 0.001% of a stated value or of a stated limit of a range, and includes the exact stated value or limit of the range.

The term "substantially" as used herein refers to a majority of, or mostly, such as at least about 50%, 60%, 70%, 80%, 90%, 95%, 96%, 97%, 98%, 99%, 99.5%, 99.9%, 99.99%, or at least about 99.999% or more, or 100%.

In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Textile-based sensors provide a promising means of overcoming traditional limitations in designing instrumented soft object, such as plush smart toys. A textile-based sensor can use common textile materials such as cotton and silk thread, and imperceptibly adapt them to enable sensing of a pressure or touch signal to yield a sensor that feels identical to ordinary, non-modified textiles. In addition, a textile-based sensor can provide for improved sensitivity compared to more conventional pressure sensors, which makes it possible to instrument plush toys or other soft objects by placing the textile-based sensors below the outer fabric layer of the plush toy so that the textile-based sensors are even less obtrusive.

As described in more detail below, textile-based sensors provide for the creation of highly instrumented toys that integrate a large number of sensors to measure fine-grained and spatio-temporally complex interactions. In contrast to interaction with toys that comprise conventional rigid sensors, interaction with a fully soft toy can be much more complex, e.g., incorporating actions by both hands and body contact. These interactions can range from holding, patting, or tickling the toy while simultaneously squeezing or holding it. However, the highly-dimensional nature of the interaction possibilities and methods requires equivalently high degree of instrumentation of the toy in order to accurately determine the type of interaction.

The present disclosure describes an end-to-end hardware and software design of a highly-instrumented soft object, and in particular a highly-instrumented plush toy, which will be referred to generically as "the smart plush toy" or simply "the plush toy" hereinafter. Those having skill in the art will appreciate that the methods and systems described herein are not limited to application in a plush or soft toy, but could be used in other soft or plush objects. The present disclosure also describes methods of addressing the myriad challenges associated with highly-instrumented interactive measurement. In particular, the present disclosure describes overcoming engineering and design challenges associated with optimization of form-factor, sensor data acquisition, low-power analytics, and low-power communication.

From a sensor design perspective, the smart plush toy is designed to comprehensively capture a range of complex interactions that are expected by equipping the smart plush toy with a large, and in some examples dense, array of textile-based sensors to enable fine-grained sensing and to cover a large portion of the interactive surface area of the smart plush toy with sensors, and in some examples by covering a majority of the interaction surface are of the plush toy with the sensors. In an example, at least some of the sensors in the array, and in some examples each of the sensors of the array, are embedded under an outer fabric layer of the toy so that the sensors are fully invisible and imperceptible to the user. As described in more detail below, the sensors are configured to achieve high sensitivity to pressure despite the fact that the sensors are placed beneath the outer fabric layer. For example, the sensors can be optimized by reducing impedance of one or more layers of the sensor using an ionized solution to ensure that each sensor can capture key interactions. In addition, sensor conditioning circuits can be designed to have high dynamic range by exposing both amplified and unamplified channels, thereby providing for a high signal-to-noise ratio while capturing both gentle and rough interactions with the smart plush toy.

As is also described in more detail below, the hardware design and data acquisition configuration can be designed using ultra-low power and small form-factor hardware that is placed deep within the plush toy to process signals from each sensor channel associated with the large number of sensors in the array. For example, in one configuration, the array of sensors can comprise two dozen (24) textile-based sensors located at various positions around the surface of the plush toy, and each sensor can include two separate sensor channels, for a total of forty eight (48) sensor channels for the entire array. In this configuration, the hardware can be configured to amplify, filter, and acquire from all 48 sensor channels, and to do so with relatively low power consumption and in a small form factor associated with the size of a child's plush toy. In an example, amplification and data acquisition circuits were optimized using low-power analog multiplexers and optimized sampling to acquire data from the large number of sensor channels (e.g., 48 analog channels) simultaneously with very low power consumption while rejecting common noise sources like powerline interference.

In an example, the method of analyzing interaction data includes local processing, remote processing, or both local processing and remote processing. Local processing is suitable when the smart toy is intended to execute autonomously without requiring connection to an external device or the Internet. Remote processing allows data to be transmitted from the smart toy to a computing device, such as a smart phone, a tablet, or a personal computer, to enable a broader range of web-based interactive storytelling applications. In examples that utilize both local processing and remote processing, there is provided maximal flexibility in terms of use-cases of the smart toy.

As described in more detail below, in an example, machine learning is used to optimize the local processing, e.g., in order to fuse sensor data from the large number of sensor channels to classify simple and spatio-temporally complex interactions with the smart toy, as well as localize these interactions. The machine learning model has been configured, as described below, to deal with several issues such as cross-talk between sensor elements as well as other confounding phenomena, while also allowing for lightweight and small-sized devices that can fit within the resource constraints of a low-power microcontroller. In an example, this is achieved with a resource-aware convolutional neural network model (described in more detail below) with early exit at intermediate layers such that overall computational overhead can be reduced or minimized.

In an example, remote processing is optimized by compressing the multi-channel data and leveraging correlations between the different streams and transmitting the compressed data to an external computing device, for example via a Bluetooth low energy ("BLE") radio. In an example, the aggregation technique uses an autoencoder that aggregates streams that have similar data to reduce transmission overhead. In an example, the remote model is more resource-intensive than the local model since the remote computing device can have more computing resources.

In an example, end-to-end implementation and evaluation of the data provides for:

(a) Classification of single fine-grained interactions with an accuracy of 86% and of complex fine-grained interactions with an accuracy of 83%, which is better than several alternative resource-constrained machine learning models. The accuracy was further increased to as high as 92% to 94% for medium-grained and coarse-grained classification.

(b) In cases of local processing, the use of early exit reduced processing power consumption by 45% while losing only 4% accuracy, enabling embedded signal processing on a low-power microcontroller for real-time classification and interaction.

(c) In cases of remote processing, dynamic channel dimension reduction using an autoencoder reduced transmission power consumption over a low-energy radio (e.g., a BLE radio) by 43%, while sacrificing only 2% accuracy.

(d) In an example, the plush smart toy system included the entire gamut of hardware required, from sensor to processor to radio. In an example, hardware power and latency benchmarks on a low-power microcontroller with a low-energy radio (e.g., nRF52840 system-on-chip microprocessor supporting BLE transmission, sold by Nordic Semiconductor (Trondheim, Norway)) show that implementation of a lightweight device can be executed with low delay and low power consumption and is practical for real-world deployment.

Smart Plush Toy System Hardware

In an example, the hardware architecture of the smart toy is designed to achieve three main goals:

1) a look and feel that is identical or substantially identical to a corresponding typical plush toy that does not include sensors, e.g., so that a user interacting with the toy (such as a child playing with the plush toy) does not alter his or her behavior toward using the toy compared to how he or she would interact with a corresponding non-sensored plush toy.

2) sensor coverage over a large surface area of the plush toy, e.g., coverage of 50% or more of the surface area, for example of 55% or more, 60% or more, 65% or more, 70% or more, 75% or more, 80% or more, 85% or more, 86% or more, 87% or more, 88% or more, 89% or more, 90% or more, 91% or more, 92% or more, 93% or more, 94% or more, 95% or more, 96% or more, 97% or more, 98% or more, or 99% or more of the surface area of the plush toy. As used herein, the term "sensor coverage," refers to the percentage of the surface area of the plush smart toy that will be picked up by at least one sensor of the sensor array when a particular location along the surface area of the toy is interacted with. A high sensor coverage allows the sensor array to capture a wealth of complex interactions across different locations of the toy.

3) High signal quality across a range of pressures applied during interaction, from very gentle pressure, e.g., during tickling or light petting, to moderate pressure during rubbing, to orders of magnitude higher pressure while squeezing the toy.

FIG. 1 is a schematic diagram of an example system 10 including a plush object, e.g., smart a plush toy, which includes an array 12 of textile-based sensors 14 that are coupled to the plush toy 10 proximate to an outer fabric layer 16. In an example, the textile-based sensors 14 are coupled to the outer fabric layer 16, such as by being sewn or otherwise coupled to a back side of the outer fabric layer 16. As used herein, the term "textile" or "textile-based," when referring to the substrate that forms each of the one or more layers of the textile-based sensors 14 refers to a structure comprising one or more fibrous structures, and in particular to threading or thread-like structures (such as yarns, threads, and the like), arranged to collectively form a bendable, sheet-like layer of cloth or cloth-like material (such as by weaving or otherwise combining the one or more fibrous structures into a cloth layer). "Textiles" commonly refers to materials that form the cloth or fabric layers of a garment or other apparel, although the present description is not limited merely to "textiles" that are typically used for garment or apparel fabrication. That being said, in some examples, the substrates that are used to form each of the textile-based sensors 14 may be a conventional, off-the-shelf woven or non-woven fabric, such as cotton or bast-fiber fabric.

The use of textile-based sensors enables the sensor to conform or substantially conform to the contour of the plush toy 10, which allows for enhanced sensing efficiency in the region or regions of interest. In contrast, traditional force sensors are usually point sensors due to their rigid nature. Even so-called "flexible" force sensors are not capable of bending in multiple directions so that even those flexible sensors will tend to change the feel of the toy. In addition, flexible and push-button sensors are susceptible to mechanical aging and wearing out. Additionally, the textile-based sensors 14 provide flexibility to fit to odd 3D contours, such as noses and ears, which provides an advantage for the textile-based sensors 14 of the smart plush toy 10 of the present disclosure.

Figure 2:
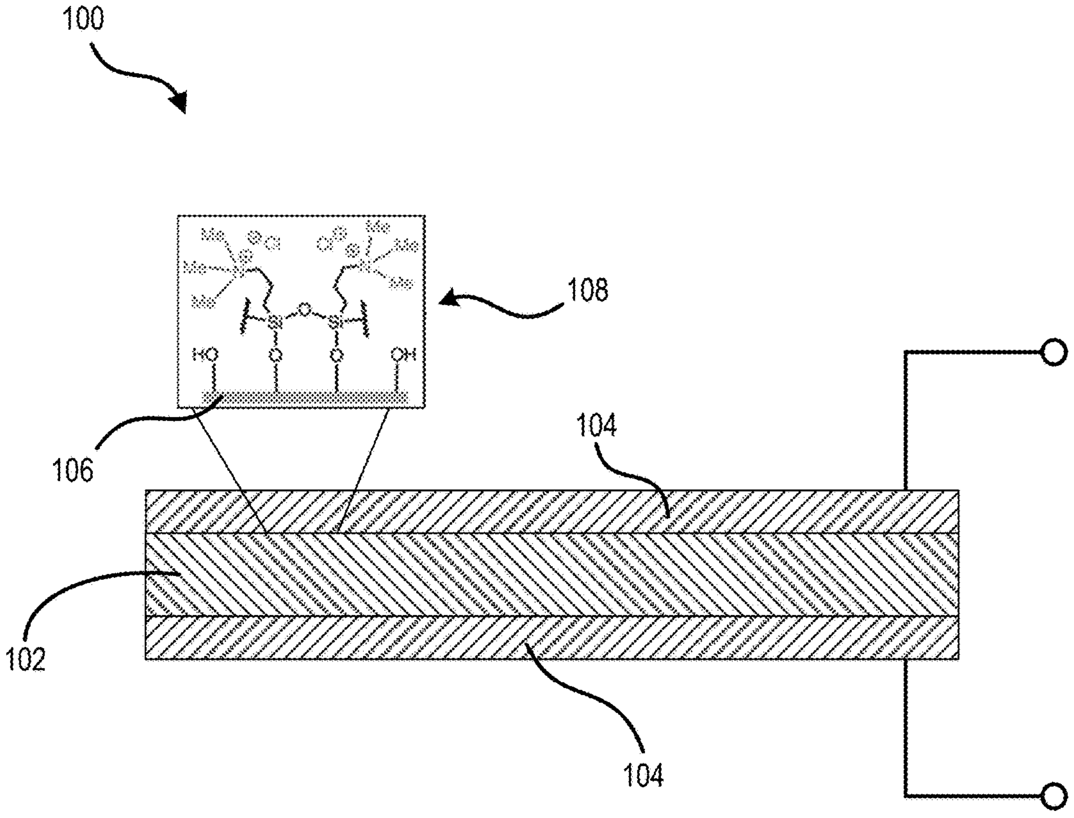
FIG. 2 is a cross-sectional diagram of an example textile-based pressure sensor that can be used in a plush object, according to the present disclosure.
Figure 3:
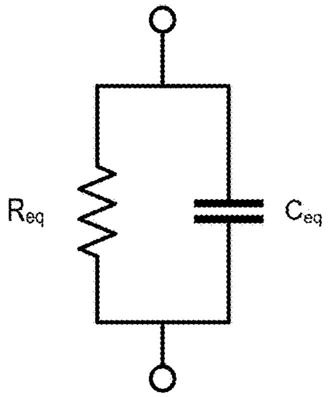
FIG. 3. is a schematic diagram of an equivalent circuit for the textile-based pressure sensor of FIG. 2.
Figure 4:
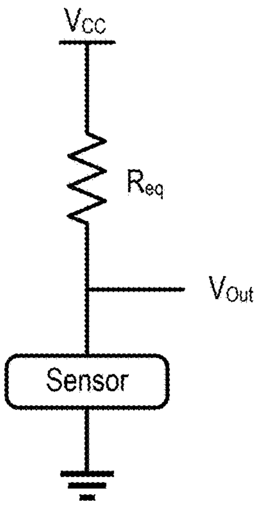
FIG. 4 is a schematic diagram of an example sensing circuit for sensing pressure changes acting on the textile-based pressure sensor of FIG. 2.

Each of the textile-based sensors 14 are configured to detect and measure pressure being applied onto the textile-based sensor 14. In an example, the textile-based sensors 14 are able to be placed beneath the outer fabric layer 16 of the smart plush toy 10 so that the textile-based sensors 14 will be imperceptible to the user in terms of look and feel. FIG. 2 shows a cross-sectional view of an example textile-based sensor 100 that can be used as any one of the textile-based sensors 14 in the plush toy 10 of FIG. 1. FIG. 3 is a circuit diagram of an electrical equivalent of the textile-based sensor 100 of FIG. 2. FIG. 4 is a diagram of a method of measuring pressure using the textile-based sensor 100 of FIG. 2.

As shown in FIG. 2, in an example, the textile-based sensor 100 includes one or more highly-resistive inner layers 102 sandwiched between two conductive outer layers 104. The textile-based sensor 100 is configured to detect applied pressure by measuring a change in resistance of the highly-resistive inner layer 102 that occurs proportional to the pressure applied to the sensor 100. As used herein, the term "highly-resistive" when referring to the inner layer 102 refers to a structure with an overall resistance of 1 Mega-ohms (MΩ) or more. As used herein, the term "conductive" when referring to the outer conductive layers 104 refers to a structure that is relatively free to conduct electrical current therethrough, for example a structure with a resistance of 100Ω or less.

In an example, the highly-resistive inner layer 104 is formed from one or more textile-based substrate layers 106. However, the design of the inner textile-based layer 104 is not straightforward as it would seem because the ballistic signal due to some types of user interaction may be extremely weak, such as when the user is lightly petting or gently tickling the plush toy. If the textile substrate 106 is an insulator like regular cotton, then the resistance is extremely high (e.g., on the order of teraohms) and it is extremely complex and expensive to design a sensing circuit to measure minute resistance changes at such high electrical impedance. High impedance can be desirable in the circuit to measure changes in a high impedance sensor, but this makes the circuit very sensitive to noise, e.g., a small current induced on a high-impedance circuit results in higher noise voltage than the same noise on a low impedance circuit. There can be many sources of noise in textile-based circuits that use large conductive layers, such as electromagnetic noise, static fields, and motion artifacts. Therefore, the inventors have found it can be advantageous to operate in a lower impedance regime to minimize the impact of noise on the signal. On the other hand, if the textile-based inner layer 102 is too conductive, then it can short too easily after a small amount of pressure is applied and may not be able to cover the range of pressures that may be typical for interaction with a plush toy 10, e.g., from the light petting or tickling mentioned above to higher pressure associated with heavier patting or hugging. Thus, the inventors have found that the textile-based inner layer 102 should operate in a "sweet spot" where the fabric is optimized with sufficiently high resistance so that it does not create a short circuit even under higher pressures associated with heavier patting and hugging while at the same time having a resistance that is low enough so that it will be sensitive to small pressure changes due to gentler interactions such as tickling or light petting.

In an example, the inner layer 102 comprises one or more functionalized textile layers comprising a textile substrate 106, such as a cotton fabric, onto which has been applied one or more functionalized coating materials 108 to form one more functionalized coating layers (shown in the inset of FIG. 2). The functionalized coating material 108 allows the resistivity of the resulting functionalized inner layer 102 to be proportional to the pressure being applied to the textile-based sensor 100. In an example, the one or more functionalized coating materials 108 modify surface resistivity of the inner layer 102 compared to the textile substrate 106 without the functionalized coating. In some examples, a functionalized coating is not necessary, e.g., if the textile-based substrate 106 itself has a resistivity value that is within a desired range.

In some examples, the one or more functionalized coating materials 108 are applied via vapor deposition onto the textile substrate 106. In an example, the functionalized coating material 108 comprises a hydrophobic, perfluorinated alkyl acrylate that can be vapor deposited onto the textile substrate 106 with a vacuum reactor deposition chamber to provide a perfluorinated coating. A perfluorinated coating are superhydrophobic and are commonly used to create stain-repellant and sweat-repellant upholstery and active wear. In some examples, however, a perfluorinated alkyl acrylate surface coating resulted in the inner layer 102 having increased resistivity as compared to a pristine, e.g., non-coated, textile substrate 106. Therefore, in another example, the chemical structure of the point where the coating is chemical grafted onto the textile substrate 106 includes a siloxane moiety, which was found to not attenuate the high surface resistivity observed with perfluoroalkyl coatings. Without wishing to be bound by any particular theory, the inventors hypothesize that such increases in surface resistivity evolved because perfluoroalkyl coatings contained saturated alkyl chains without accessible conductive states. As most textile coatings are similarly insulating, the inventors believed that a surface coating that imparts either electronic or ionic conductivity to the textile substrate of the inner layer 102, such as the coating material 108 comprising the siloxane moiety, is beneficial.

In yet another example, the functionalized coating material 108 comprises an ion-conductive coating material because ionic conductors are comparatively more compatible with salt-rich biological systems than electronic materials. One example of an ion conductive coating material that can be used is a siloxane containing quaternary ammonium moieties, such as N-trimethoxysilylpropyl-N,N,N,-trimethylammonium chloride, as shown in the inset of FIG. 2. The siloxane moieties were found to covalently bond to free hydroxyl groups present in the repeat unit of cellulose acetate (e.g., cotton) on the surface of the textile substrate, while the quaternary ammonium moieties and their chloride counterions act as ion conductors that reduce the observed surface resistivity of the textile substrate. The surface resistivity of the coated inner layer is proportional to the surface concentration of the quaternary ammonium groups, which, in turn, is proportional to the concentration of the siloxane molecule used during the solution-phase functionalization reaction that forms the functionalized coating.

Another example of an ion-conductive material that can be used as the coating material 108 comprises a highly p-doped poly(3,4-ethylenedioxythiophene) (also referred to herein as "p-doped PEDOT" or simply "PEDOT"). In an example, the p-doped PEDOT is uniformly or substantially uniformly charge balanced with one or more counterions. In an example, the counterions comprise chloride counterions. In an example, the concentration of chloride ions is about 1010 ions per cubic centimeter ($cm^3$) and a concentration variation of ±about 103 ions per $cm^3$. In another example, the counterion comprises at least one of bromide, iodide, sulfate, acetate, formate, lactate, or combinations thereof.

In an example, the PEDOT polymer that is used for the coating material 108 has the structure of formula [A]:

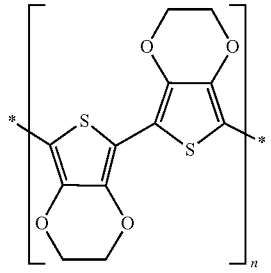

[A]

where "n" is the number of repeat units. In an example, n can be 20 or more, for example 30 or more, such as 40 or more. In an example, n is from about 20 to about 10,000, for example from about 50 to about 9,000, such as from about 100 to about 8,500.

Further details of one example method of applying PEDOT to a textile substrate is described in U.S. Patent Application Publication No. 2019/0230745 A1, titled "ELECTRICALLY-HEATED FIBER, FABRIC, OR TEXTILE FOR HEATED APPAREL," published on Jul. 25, 2019, and filed on Jan. 25, 2019, the disclosure of which is incorporated herein in its entirety by reference.

In examples where the coating material 108 comprises the p-doped PEDOT, the resulting coating can have an electrical resistance of from about 0.1 to about 10,000 Ohms per square inch ($\Omega/in^2$). In an example, the coating formed from the PEDOT has a thickness of from about 100 nanometers (nm) to about 10,000 micrometers (μm) or about 10 millimeters (mm), such as from about 100 nm to about 1 μm. In an example, the coating formed from the PEDOT coating material 29 are uniformly or substantially uniformly p-doped throughout the entire volume of the coating, as revealed by bulk optical absorption measurements.

The weave density of the textile substrate 106 can also affect the overall resistivity of the textile-based sensor. In an example, the textile substrate 106 comprises a cotton gauze substrate with a medium weave density. The inventors found that a medium weave density minimized the occurrence of shorting events in the inner layer 102 and provided for the most stable pressure-induced electrical signals.

In an example, each of the conductive outer layers 104 are formed from one or more textile-based layers so that the textile-based sensor 100 will be an "all-textile" sensor. In an example, each of the conductive outer layers 104 comprises a silver nylon. The conductive outer layers 104 act as the electrodes of the textile-based sensor 100, which can be connected to a detection and amplification circuit (described in more detail below).

In an example, various test sensors of the same size were created by sandwiching a sheet of cotton (either pristine or functionalized with an ion-conductive coating) between two silver nylon fabric conductive layers. As discussed above, examples where the cotton gauze substrate is functionalized with N-trimethoxysilylpropyl-N,N,N,-trimethylammonium chloride displayed a more sensitive voltage change with applied pressure as compared to a pristine cotton gauze or cotton lycra substrate. Therefore, three-layer devices containing an ion-conductive cotton gauze proved to be efficient and simple sensor of applied pressure.

In an example, the functionalized coating 108 was shielded with an optional protective coating (not shown in FIG. 2), to impart wash stability and/or resistance to spilled liquids for the textile-based sensor 100. In an example, the protective coating comprises a hydrophobic material, such as a perfluorinated siloxane coating, which can be deposited through vapor deposition to form the protective coating. The protective coating offers an effective barrier against any degradation of properties in the fabric textile-based sensor 100 caused by the wearer sweating, washing, rubbing and any other aging processes.

The ion-conductive coating 108 of the functionalized inner layer is different from previously-known commercial textile coatings, which have typically been applied to impart hydrophobicity (e.g., for stain-repellent fabrics) or to create antimicrobial material. For both hydrophobic and antimicrobial functionality, known coating materials are electrically insulating and, therefore, previously-known iterations of functionalized textiles are not usable in the design of the textile-based sensor 100.

In an example, the textile-based sensor 100 comprises one or two layers of ion-conductive functionalized cotton gauze as the inner layer 102, sandwiched between two sheets of silver-plated nylon fabric as the outer layers 104. In an example, all the textiles were sonicated in water for 15 min, and then rinsed with isopropanol and dried in the air prior to use. To chemically graft the surface of the cotton gauze substrate, the cotton gauze substrate was soaked in N-trimethoxysilylpropyl-N,N,N,-trimethylammonium chloride dissolved in isopropanol (15:100 V/V), which is a precursor to the functionalized coating material on the inner layers, for 30 min and then cured at 100 °C for 2 hours to form the functionalized coating, followed by rinsing with isopropanol and drying in air. The surface of the functionalized cotton gauze was then modified with a vapor deposition of trichloro(1H,1H,2H,2H-perfluorooctyl) silane to form a hydrophobic protective coating, which provides the sensor 100 with washability and durability. In an example, the 30-min deposition of the coating material was conducted in a custom-built, round shaped reactor (290 mm diameter, 70 mm height) under vacuum conditions, e.g., at the constant pressure of about 1 Torr absolute. The functionalized cotton gauze was then cut into eight 10 cm by 6 cm sheets, each of which was sewn around the perimeter between two corresponding 8 cm×4 cm sheets of silver fabric. Sewing together each pair of these joined gauze-silver sheets yielded four textile-based sensors each having the three-layer structure shown in FIG. 2.

Returning to FIG. 1, in an example, the smart plush toy 10 is covered with a relatively large number of the textile-based sensors 14 so that the sensors can detect which part of the plush toy 10 is being interacted with and the specific type of interaction in order to detect fine-grained interaction. In an example, high spatial fidelity is preferred for the smart plush toy 10 because interactions with soft toys often involve one or both hands and sometimes also the torso, e.g., while hugging the toy. A small number of large sensors that each cover a large surface of the toy 10 may only capture the overall pressure on the toy, and might lose both information about the location of interaction, e.g., stomach versus leg, and information about more nuanced interactions, such as tickling a toy with one hand while holding the toy with the other.

To achieve high spatial fidelity, in an example the smart plush toy 10 has an array 12 of 10 or more of the textile based sensors 14, for example 11 or more, 12 or more, 13 or more, 14 or more, 15 or more, 16 or more, 17 or more, 18 or more, 19 or more, 20 or more, 21 or more, 22 or more, 23 or more, 24 or more, 25 or more, 26 or more, 27 or more 28 or more, 29 or more, 30 or more, 31 or more, 32 or more, 33 or more, 34 or more, 35 or more, 36 or more, 37 or more, 38 or more, 39 or more, 40 or more, 41 or more, 42 or more, 43 or more, 44 or more, 45 or more, 46 or more, 47 or more, 48 or more, 49 or more, or 50 or more of the textile based sensors 14, where each sensor 14 in the array 12 is placed at a specified position along the interactive surface or surfaces of the smart plush toy 10 and is sized to detect a specified desired interaction point. In a specific and non-limited example that will be used throughout the remainder of the present disclosure for the purposes of illustration, the smart plush toy 10 has 24 sensors placed at strategic locations such as the top of the head, the ears, the forehead, the nose, the mouth, the cheeks, the chin, the arms, the ends of the arms (e.g., at hands or upper paws), the chest, the stomach, the sides, the legs, and the ends of the legs (e.g., at feet or lower paws), or any other location that might typically undergo various interactions from a user of the smart plush toy 10, and in particular at locations of expected interactions by children playing with the smart plush toy 10. Other aspects of the hardware of the plush toy 10 include the following:

Amplified and Unamplified Sensor Streams

As noted above, interactions with the smart plush toy may include a wide variation in pressure being applied by a user, varying from very light pressure for light petting or tickling to very high pressure for harder patting, rough play, or hugging, which can result in a few orders of magnitude difference between the lowest pressure and the highest pressure expected to be applied. Increasing sensitivity of the textile-based sensors 14 can accommodate some of the large range of expected pressures, the sensitivity of the textile-based sensor 14 it is not sufficient by itself. Therefore, in an example, each textile-based sensor 14 was split into two sensor streams—an unamplified stream to deal with medium to high pressure interactions, and an amplified stream for very gentle and low pressure interaction. In an example, the amplified data stream uses a band-pass filter to increase the signal-to-noise ratio (SNR) and allows the sensors 14 to acquire very weak signals such as during tickling and light petting, whereas the unamplified streams can acquire large signals, such as those associated with squeezing the toy 10 hard or strong swiping actions.

Analog Multiplexing of the Sensor Channels

The large number of channels, e.g., 48 total data streams for the amplified and unamplified streams in the non-limiting example of 24 textile-bases sensors 14 in the array 12, can result in a number of downstream challenges in sampling and processing the signals. At the hardware level, the plush toy 10 may have to deal with the fact that typical microcontrollers used on low-power devices have only a few Analog to Digital Converters (ADCs). However, to compensate for this, the smart plush toy 10 can take advantage of the fact that a relatively low sampling rate can be utilized for each individual sensor 14.

Figure 5:
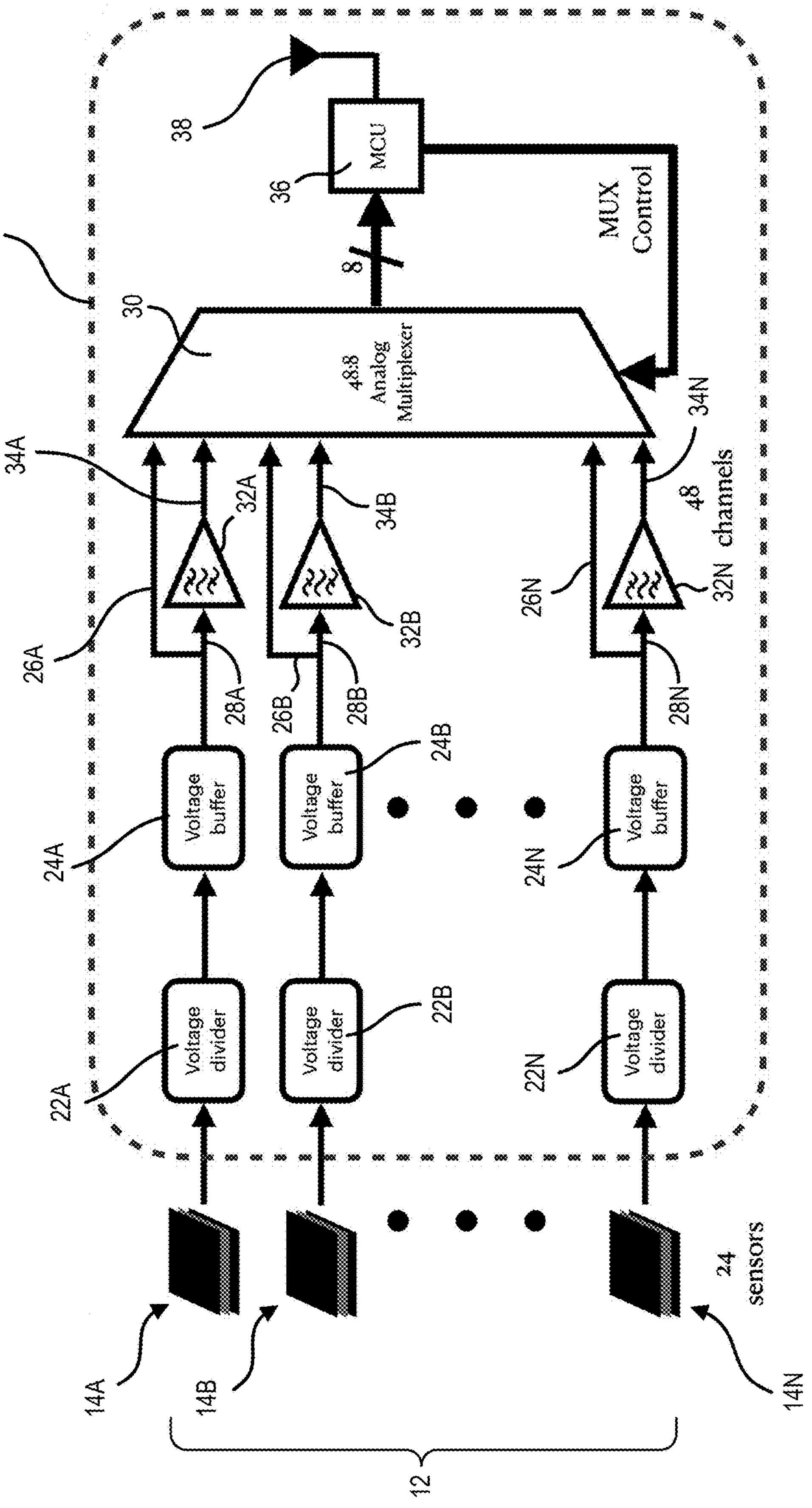
FIG. 5 is a schematic diagram of an electronics system configured for detecting and measuring pressure signals from the array of textile-based pressure sensors in the example plush object of FIG. 1.

An example electronics board 20 for implementing data acquisition from the example 24-sensor array is shown in FIG. 5. As can be seen in FIG. 5, the resistance of each textile-based sensor 14 of the array 12 is sensed by a corresponding voltage divider 22 (i.e., a first voltage divider 22A corresponding to a first sensor 14A, a second voltage divider 22B for a second sensor 14B, and so on), wherein the output voltage represents the pressure applied on the fabric surface onto the textile-based sensor 14. The circuit board 20 can also include a voltage buffer 24 corresponding to each voltage divider 22. In an example, the output voltage from each voltage divider 22 (and if present each corresponding voltage buffer 24) is spilt into two signals 26 and 28, with the first signal 26 being kept unamplified (e.g., for larger pressure interactions above a specified pressure, as described above) and fed essentially directly into a multiplexer 30. The second signal 28 from each of the sensors 14 is amplified by a corresponding amplifier 32 to produce an amplified signal 34 (e.g., for smaller pressure interactions below a specified pressure, as described above) that is also fed into the multiplexer 30. In an example, the multiplexer 30 is an analog multiplexer with a corresponding analog channel for the amplified and unamplified signal from each of the textile-based sensors 14 of the array 12. The analog multiplexer 30 can be configured to uniformly sample all the channels using control signals issued by a microcontroller 36.

While low sampling rates can suffice to capture interactions of interest, in an example, it is preferred that the sampling rate be sufficiently high so as to allow for filtration of powerline noise. While power line noise is typically not large for rigid electronic force sensors that have a very small surface area, the large surface area and relatively large sensor impedance of the textile-based sensors 14 described herein for the smart plush toy 10 can make them likely receptors for electromagnetic noise. Therefore, in an example, a sufficiently high sampling rate was used (e.g., 160 Hz per channel) to be able to filter out powerline noise. A simple moving average filter was then applied inside the microcontroller 36 with a cut-off frequency of 2 Hz to remove powerline interference. The inventors have found that the frequency of even a fast interaction like tickling is well below 12 Hz, the cut-off frequency allows the smart plush toy to retain the signal of interest while removing noise.

Hardware Power Consumption

To keep the electronics' power consumption as low as possible, in an example, the smart plush toy 10 uses ultra-low power Op-Amps, regulators, and analog multiplexers that, in combination, consume two orders of magnitude lower power than a typical low-power microcontroller.

Computational Challenges

The hardware used in the smart plush toy 10, described above, impacts the design of the downstream modules in several ways, as described below.

Large Number of Channels

A particular challenge for processing of the signals from the textile-based sensors 14 is that the large number of sensor channels (e.g., unamplified signals 26A thorough 26N and amplified signals 34A through 34N) increases computation and communication overhead. Even though each channel 26, 34 is sampled at a low rate, the large number of channels 26, 34 (e.g., 48 channels for the non-limiting example of 24 separate textile-based sensors 14) makes the cumulative sampling rate quite high, which increases overhead downstream both for analytics on the low-power microcontroller 36 and communication via a low-power radio 38.

Cross-Talk Between Sensors

In contrast to conventional electronic rigid force sensors, the textile-based pressure sensors 14 described above are double-sided, i.e., each sensor 14 will detect pressure applied from both sides of the sensor 14 from the direction of the outer fabric layer 16 and from the direction of the interior of the toy 10. As a result, the sensors 14 are also affected by internal movements of stuffing or other structures or materials within the toy 10, which might be caused by interactions with other sensors 14. Cross-talk can also occur when interaction with one sensor 14 leads to pressure being applied on other sensors 14. For instance, the close proximity of the nose and mouth sensors 14 (shown in FIG. 1) can lead to an interaction with the nose causing changes in the mouth sensor 14 as well as the sensor 14 at the nose.

Cross-talk can also occur during complex interactions that involve holding the plush toy 10 with one hand while interacting with the other hand. Since the sensors are 14 interconnected through the toy 10, there can be cross-talk between the two sensors 14 involved in the interaction i.e., an anchored sensor 14 at a location on the plush toy 10 that is being held and an interaction sensor 14 at a location where the user is performing an interactive action. As a result, while the user is performing an interaction at the location of the interaction sensor 14, a reverse force can be applied to the anchored sensor 14 as well. For instance, if a user is holding the arm of the plush toy 10 while swiping the forehead, it can lead to a signal that appears to be a swiping signal at the location of the hand sensor 14 as well as the "actual" signal at the forehead sensor 14.

Figure 6:
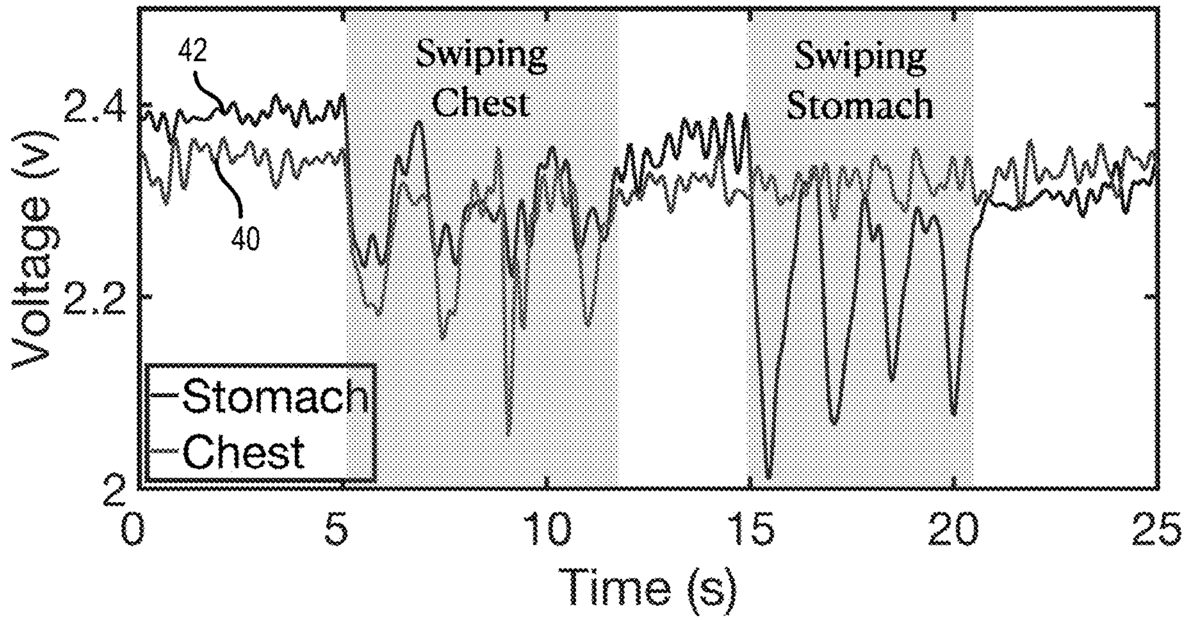
FIG. 6 is a graph of example data streams from first and second textile-based sensors in the array of the plush object located at a first and second location on the plush object of FIG. 1.

FIG. 6 is a graph showing an example of the voltage signals from a pair of sensors 14 that represents a cross-talk scenario. The actions that lead to the graph of FIG. 6 include a user swiping at the chest of the plush toy 10 near a chest sensor 14, followed shortly after by a similar swiping at the stomach of the plush toy 10 near a stomach sensor 14. As can be seen, both the chest sensor signal 40 and the stomach sensor signal 42 are affected when the user swiped the chest, while primarily the stomach sensor signal is affected when the stomach was swiped. Therefore, the chest swiping interaction leads to cross talk at the stomach sensor, while the similar stomach swiping does not result in cross talk at the chest sensor.

Effect of Humidity

A second challenge is that the textile-based pressure sensors 14 are affected by humidity as well as pressure. For example, the sensors 14 tend to have reduced resistance in a humid environment, similar to being under pressure. As a result, the output baseline will depend on base pressure as well as humidity.

Data Analysis Pipeline

Figure 7:
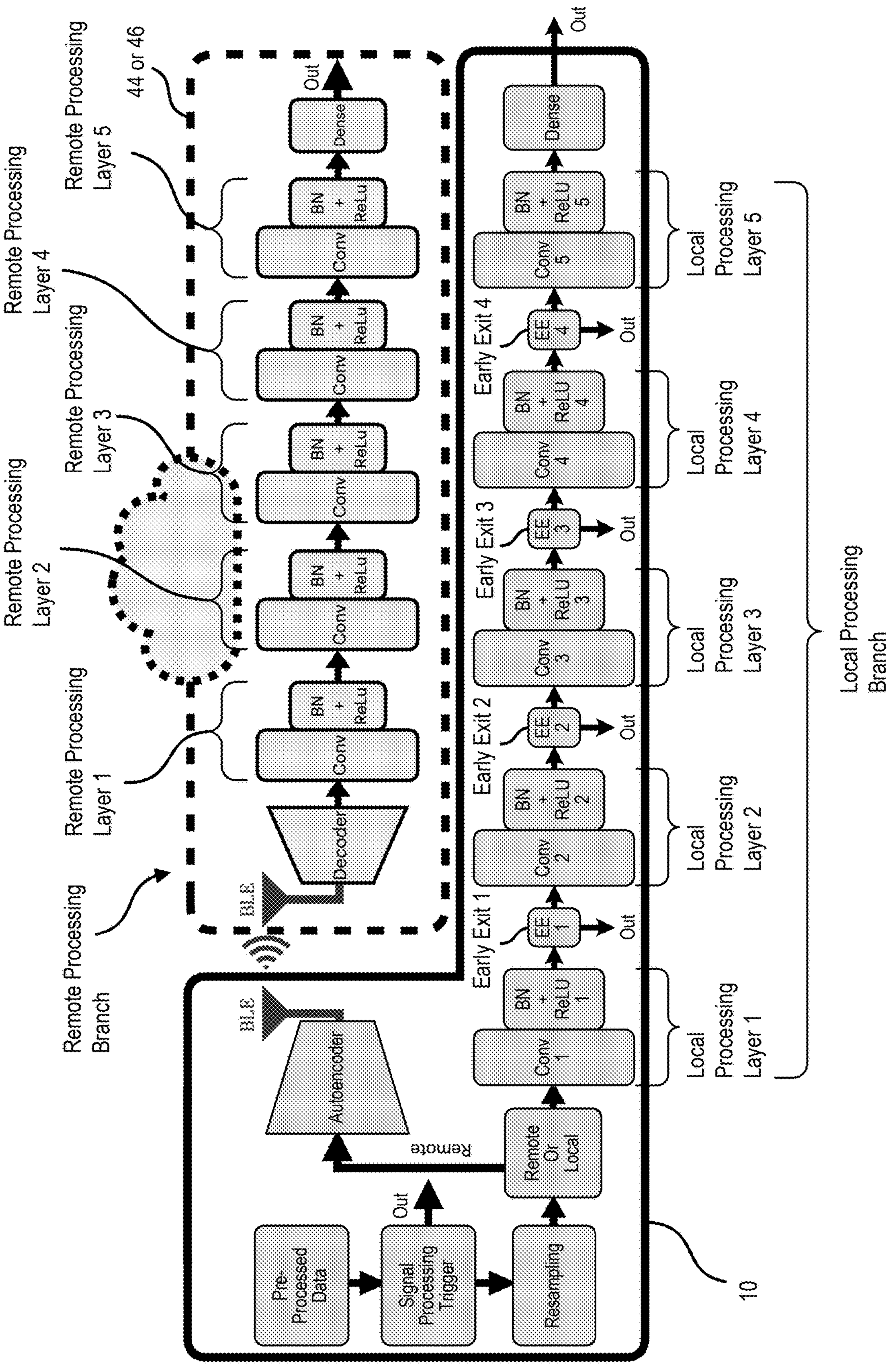
FIG. 7 is a flow diagram of an example machine learning data pipeline for analyzing data from the array of textile-based pressure sensors of FIG. 1.

FIG. 7 shows a flow diagram of an example data analysis pipeline for analyzing the pressure signals from the array of textile-based sensors 14 in the smart plush toy 10 of FIG. 1. The following section provides descriptions of the building blocks constructing the example data analytic pipeline of FIG. 7. In an example, the data analytic pipeline overcomes one or more of the challenges presented in the previous section to achieve high accuracy while optimizing power consumption.

Signal Processing Pipeline Overview

The overall computational pipeline includes a local data processing branch that is performed internally within the smart plush toy 10 (e.g., by the microcontroller 36 on the electronics board 20 of FIG. 5) and a remote processing branch that is performed remotely from the smart plush toy 10 (e.g., by another computing device that is in communication with the smart plush toy 10). The initial stage is a signal-processing triggering stage wherein the sampled data from each of the analog data channels 26, 34 (e.g., the 48 analog channels for the non-limiting 24-sensor array) is fed into a trigger block that is configured to ignore idle states when no interaction with the plush toy 10 is occurring.

Once an interaction is detected for at least one of the sensors 14, there are two possible downstream pipelines depending on whether the data is to be locally or remotely processed.

Local Processing Pipeline

The first scenario is locally processing on the low-power microcontroller 36 within the smart plush toy 10. Local processing of at least a portion of the data from the sensors 14 facilitates a fully or partially self-contained smart toy 10 that does not need to interact with an external device in order to operate. While feedback is not the focus of the present disclosure, the inventors envisage tactile or auditory feedback being incorporated into the smart plush toy 10 to enable smart interaction.

In an example, the local processing pipeline was built using the open-source platform TensorFlowLite (available at https://www.tensorflow.org/lite) for the microcontroller-class platform of the example smart plush toy 10. In an example, the local processing pipeline included a convolutional neural network model, which is supported by the TensorFlowLite framework.

In an example, in order to reduce computational overhead for the local processing model, the local processing branch can include early exit blocks between local processing layers of the neural network to reduce computation time and power.

Remote Processing Pipeline

The second scenario is remotely processing the data on an external computing device that is separate from the smart plush toy 10, such as on a smartphone 44 or a personal computer 46 as shown in FIG. 1. The data from the textile-based sensors 14 can be transmitted to the external computing device, such as via wireless transmission 48 such as WiFi or Bluetooth communication (e.g., via the radio 38 on the electronics board 20). The transmission of the data to the external computing device can offload computation and enable interaction that involves the external computing device. This can enable a range of digital applications where the smart plush toy 10 may be part of a larger story-telling or educational platform. In an example, the computational pipeline includes a dynamic channel aggregation block to reduce the size of data to be transmitted from the smart plush toy 10 to the remote computing device to reduce radio power consumption.

The building blocks of the pipeline are described in detail below.

Wake-Up Trigger

Interactions by a user with the smart plush toy 10 tend to come in bursts. Therefore, in an example, a first stage of the signal processing pipeline is a wakeup signal processing trigger to detect when the smart plush toy 10 is in an idle state where there is no interaction versus an active state when there is interaction. The inventors believe that interactions between the user and the smart plush toy 10 will cause signal distortions, especially on the amplified signals 34. Therefore, in an example, the signal processing trigger uses a standard deviation of the amplified channels 34 as a simple indicator of activity.

To adapt the signal processing trigger block to dynamic changes such as changes in ambient powerline noise and in the resistance of the textile-based sensors 14 due to temperature and humidity (which affects the standard deviation of analog channels 26, 34), in an example, the signal processing trigger block uses a dynamic threshold based on a summation of the standard deviations of all amplified channels 34, as shown in Equation [1].

$$S_{th} = \alpha \times \min_{t>0}\left(\sum_{\forall ch \in Ch_{amp}} std(v_{ch})\right) \quad [1]$$

In Equation [1], $Ch_{amp}$ is the set of amplified channels 34 of the array of textile-based sensors 14 (e.g., the 24 amplified channels 34 in the non-limiting example of a 24-sensor array 12). α is a tuning coefficient. For each time window, the sum of the standard deviations of voltage traces in the amplified channels 34 is compared with this threshold to decide whether to trigger a wakeup. In an example, this module is implemented in analog to avoid the MCU 36 having to wake up and sample the channels 26, 34. In an example, the signal processing trigger block is implemented on the microcontroller 36 within the smart plush toy 10 for ease of prototyping.

Local Processing Feature Extractor

In an example, the local processing branch of the pipeline includes a feature extractor configured to extract features from the data to determine what interaction may have taken place with the sensor 14 of the array 12. In an example, the feature comprises a plurality of neural network processing layers, for example the 5 local processing layers shown in FIG. 7. In an example, each of the local processing layers a one-dimensional convolutional layer (e.g., Cony 1-5 in FIG. 7) following by a batch normalization block (also referred to as "Batch Norm" or simply "BN" in FIG. 1) as well as a rectified linear unit (ReLU in FIG. 7), and a fully connected layer ("Dense" in FIG. 7). In an example, the local processing branch includes an early exit (EE 1-5 in FIG. 7) after one or more of the local processing layer in order to reduce or optimize computational power consumption by the microcontroller 36.

Convolutional Block

In an example, each processing layer includes a convolutional block ("Cony" in FIG. 7), which allows the pipeline to learn the cross-talk between sensors 14. The inventors have found that a single convolutional layer will only capture the patterns within a limited range which the present disclosure will refer to as the "receptive field." For example, a convolutional kernel of size three maps sensor data from three adjacent sensors 14 into one data point of the feature map. However, cross-talk can extend to farther away sensors 14, particularly for complex interactions where it is difficult to precisely determine which sensors 14 are being impacted by the pressure at the anchor sensor 14 location and the interaction sensor 14 location.

Physically adjacent sensors 14 cannot always be adjacent in the input matrix to the neural network. Therefore, in an example, each local convolutional layer is stacked in a multi-scale manner so that the early layers with a smaller receptive field can capture near-field patterns of the sensors 14 that are adjacent in the data plane and so that the latter layers with a larger receptive field can perceive potential cross-talk relationships between the sensors 14 that are far away in the data plane.

Batch Norm

In order to overcome humidity-related artifacts, the local convolutional layers embed a batch normalization block ("BN" in FIG. 7) in a feature extractor stage of each local processing layer. In an example, the Batch Norm blocks standardize internal features after each convolutional block. In an example, each Batch Norm block not only contributes to the steadying of the training process by whitening the features and mitigates biased distribution, but also helps to rectify the biased input due to the humidity during the model inference time. In an example, each Batch Norm block can also include a rectified linear unit ("ReLU" in FIG. 7)

Local Early Exit

To reduce the computation time and energy cost for the microcontroller 36, in an example, the local processing branch of the pipeline includes one or more early exits ("EE" in FIG. 7). In an example, the pipeline includes an early exit after each local processing layer (e.g., a first Early Exit 1 after a first Local Processing Layer 1, a second early exit EE2 after a second Local Processing Layer 2, a third early exit EE 3 after a third Local Processing Layer, and so on). The early exits allow the pipeline to obtain predictions at intermediate stages in the pipeline. The inventors believe that many types of interactions, and possibly even a majority of data cases, can be classified with a few layers or less of computation and that only a few more complex data cases may require the entire deep learning pipeline. The early exits allow the pipeline to cease using computational resources in the easier-to-classify data cases after the minimum number of processing layers needed to classify a particular interaction.

Table 1 shows an example feature extractor for the local data processing model. Interaction predictions based on the multiple channels of raw sensor data (e.g., the 48 channels 26, 34 comprising the amplified channels 34 and the unamplified channel 26 off of each of the 24 sensors 14 in the non-limiting 24-sensor array 12) at the granularity of a second. In an example, the classification result is only generated once within a given time window, which indicates a category and a position of an interaction for the given time period. In an example, a time window of 3 seconds with 2 seconds of overlap between windows was used.

TABLE 1

Structure of Feature Extractor

| Layers | Specifications | Input | Output |
|---|---|---|---|
| Conv1(+BN + ReLU6) | kernel: 3, stride = 1 | (1, 48) | (12, 48) |
| Conv2(+BN + ReLU6) | kernel: 3, stride = 1 | (12, 48) | (24, 48) |
| Conv3(+BN + ReLU6) | kernel: 3, stride = 1 | (24, 48) | (48, 48) |
| Conv4(+BN + ReLU6) | kernel: 3, stride = 1 | (48, 48) | (24, 48) |
| Conv5(+BN + ReLU6) | kernel: 3, stride = 2 | (24, 48) | (24, 24) |
| Dense | output: (37,) or (103,) | (576,) | (37,) or (103,) |

Remote Processing

In an example, remote data processing is similar to the local data processing model except, with two potential differences. First, a data reduction module can be included to minimize communication overhead. Second, the early exit modules can be omitted since it is assumed that there are less stringent computation resource limitations at the remote computing device.

Dynamic Channel Aggregation

In an example, the input dimension is reduced by downsampling the time series data for all data channels in order to reduce overall communication cost between the smart plush toy and the separate computing device. For example, the data channels can be aggregated by using an autoencoder that aggregates the streams to reduce the number of data streams to a desired value. In an example, the autoencoder interface includes an encoder located at the smart plush toy 10 and a corresponding decoder located at the remote computing device. In an example, the encoder will be part of an "internet of things" (IoT) device to efficiently aggregate and encode the original streams into a smaller size. While the autoencoder can work in an unsupervised manner, in an example, the encoder and decoder are jointly trained together with the prediction pipeline for better performance. In an example, the number of the streams that the autoencoder learns to aggregate during each training is manually assigned.

The inventors have found that the number of output streams directly affects the size of required data to be transmitted through the radio 38, and as a result, directly reduces communication power consumption. The trade-off between reducing data streams and the drop in system accuracy is discussed below in the "Evaluation" section.

Remote Computational Model

In an example, the remote classification model is similar to the local classification model. For example, the remote classification model can include a plurality of remote processing layers that each include a one-dimensional convolutional layer following by a batch normalization block as well as a rectified linear unit. However, as can be seen in FIG. 7, in an example, the remote processing branch does not include early exit modules because, as noted above, it is assumed that computing resources are not as limited in the remote computing device.

In an example, a major advantage of remote processing is the ability to leverage more complex models. For example, due to limitations in computing power, the local data processing model may not be able to maintain state over time, while the remote data processing model may be able to take advantage of temporal context to place a current interaction within a larger interaction session.

Implementation

In this section, the implementation of an example smart plush toy system is described. As shown in FIG. 1, in a non-limiting example, a plush teddy bear 10 was to implement the smart toy system. FIG. 1 also shows placement of twenty four (24) textile-based pressure sensors 14 on the toy. It is noted that, as discussed above, the textile-based sensors 14 were placed underneath the outer fabric layer 16 of the teddy bear toy 10 so that there was no perceptible change to the feel and texture of the exterior of the toy 10 compared to an identical bear that did not include the textile-based sensors 14.

Textile-Based Sensor Design and Placement

As discussed above and as shown in FIG. 2, in an example, each textile-based pressure sensor 14, 100 comprises three (3) layers. Two conductive outer layers 104 that act as electrodes and cover a resistive middle layer 102. As noted above, in an example, each of the conductive outer layers 104 comprises a silverized nylon fabric and the inner layer 102 is a functionalized cotton gauze. In an example, the size of each textile-based sensor 14 varies from 2×2 $cm^2$ to 3×3 $cm^2$, depending on the position of a particular sensor within the toy 10. In an example, the cotton gauze of the inner layer 102 is sonicated in deionized water (e.g., for 15 minutes), rinsed (such as with isopropanol), then heated (e.g., at 100 °C for 2 hours). This treated cotton gauze can be rinsed once more (e.g., in isopropanol) and dried (e.g., for 6 to 12 hours or more). Then the treated cotton gauze can be coated with a functionalized coating material 108, such as a perfluorosilane. In an example, the functionalized coating material 108 is applied to the cotton gauze substrate via vapor deposition to add wash-stability to the sensor 14.

To measure a resistance of a textile-based sensor 14, the sensor 14 can be connected to a voltage divider circuit 22 where one of the electrodes (e.g., one of the conductive outer layers 104) is grounded (as shown in the sensing circuit of FIG. 4). In an example, the grounded electrode is placed outward so that it is closer to human skin during interaction for the purpose of shielding the sensor 14. This is due to the fact that the human body carries electrical charge, which can be coupled into the sensors 14 and confound the interaction signal. By grounding the outermost conductive layer, the extra charge of the human body is routed to ground so that it will not show up in the output signal.

Electronics Board

In an example, the textile-based sensors 14 are internally routed to an electronics board 20, such as via internal wiring 50 shown in FIG. 1. In an example, the electronics board 20 includes the electronics components described above with respect to FIG. 5. In an example, the electronics board 20 is a printed circuit board (PCB) that incorporates standard, off-the-shelf components. In an example, the off-the-shelf components include one or more, and in some examples all of, the following: (a) an analog multiplexor 30 with a supply current requirement of 1 microamp (μA) sold under the trade name ADG1604 by Analog Devices, Inc. (Wilmington, MA, USA); (b) ultra-low power operational amplifiers 32 with a supply current requirement of 550 nanoamps (nA) sold under the trade name TLV8544 by Texas Instruments Inc. (Dallas, TX, USA); (c) a microcontroller 36 and Bluetooth low energy (BLE) transmitter with a supply current requirement of 1.6 milliamps (mA), sold under the trade name nRF52811 by Nordic Semiconductor (Trondheim, Norway); and a regulator operating at 3.3 volts (V) with a supply current requirement of 55 nA, sold under the trade name S-1318 by ABLIC Inc. (Tokyo, Japan).

The electronics board receives signals from each of the textile-based sensors 14 of the array 12 (e.g., all 24 sensors of the non-limiting 24-sensor array). In an example, the electronics board 20 filters the signals (e.g., with a voltage divider 22 and a voltage buffer 24) and creates two sub-channels 26, 34 (e.g., one amplified 34 and one unamplified 26). The resulting unamplified sub-channel 26 and the amplified sub-channel 34 (e.g., 48 subchannels for the non-limiting 24-sensor array) are multiplexed into a plurality of analog-to-digital convertor (ADC) channels (e.g., 8 ADC channels for the non-limiting 24-sensor array with 48 sub-channels) for the microcontroller (MCU) 36 using analog multiplexer integrated circuits (ICs) (e.g., 4 analog multiplexer ICs for the 48 subchannels into the 8 ADC channels). In an example, each multiplexer channel outputs two out of its 12 inputs according to address bits provided by the microcontroller 36. Finally, in an example, the microcontroller 36 digitizes and transmits the data to a computing device (such as a smartphone 44 or a personal computer 46) via a radio 38, such as by using a wireless communication link 44 (as shown in FIG. 1), for example the Bluetooth Low Energy (BLE) protocol.

In an example, the microcontroller runs 36 an application that provides address control signals for the multiplexer, reads the analog channels from the ADC channels, creates packets from the samples and an index for packet loss detection. In an example, a moving average filter over seven samples and duty cycling was used to reduce power consumption.

Implementation of Classification Processing Model

For the classification task, both single interactions (interaction at one sensor location) and complex interactions (concurrent or substantially interactions at two or more sensor locations). For a given time window, the tuple (interaction and position) that is most frequently shown as the ground truth for a particular single interaction. Similarly, for complex interactions, the most frequently seen two single interactions was as the ground truth.

In an example, leave-one-out cross-validation was used for the model training. Due to the fact that many of the ground truth labels are "no interaction" in the collected data and the labels are unbalanced, a data sampling technique of cross entropy loss was used to balance the labels in the dataset for the model training. In an example, cross entropy loss was defined by the function of Equation [2], below.

$$\text{Loss} = -\frac{1}{N}\left(\sum_{i=1}^{N} y_i \cdot \log(\hat{y}_i)\right) + \|W\|^2 \quad [2]$$

where $y_i$ and $\hat{y}_i$ are the ground truth label and prediction label, $\|W\|^2$ is the l2-regularization of the model parameters, and N is the size of the dataset.

In an example, the local and remote data processing were executed on a microcontroller 36 as described above, such as the nRF52840 system-on-a-chip platform (Nordic Semiconductor (Trondheim, Norway)), which is a low-power ARM-based embedded device with Bluetooth Low Energy (BLE) protocol support, providing for both the local and remote processing pipelines. In an example, the local data processing model was found to require about 18.5 KB of RAM and about 153.7 KB of flash memory, corresponding to 7% and 15.3% of available capacity of the MCU 36, respectively.

Evaluation

In order to validate the performance of the smart plush toy 10, a series of experiments were performed, which also highlight the benefits of the smart plush toy hardware and machine learning pipeline, and provides a breakdown of the contribution of various building blocks in the smart plush toy 10.

User Study

Eighteen (18) participants were asked to perform several interactions with the smart plush toy 10 as part of an Industrial Review Board (IRB) approved study. Interactions that were performed by the participants included holding, patting, tickling, and swiping the toy 10. This combination of interactions was chosen as an example of meaningful interactions that were expected to be performed with a toy (e.g., holding a hand while patting the head). Separation of single and complex interactions provided the opportunity to monitor the impact of complex interactions and compare the performance of the machine learning pipeline with other models. Thirty seven (37) single interactions from a pool of possible interaction and location pairs were chosen to test the possibility of detecting the interaction and its location by the data processing pipeline described above. In addition, sixty five (65) complex interactions were chosen that include holding one of the toy's arms and performing the other interactions with a user's free hand. Including an idle state, there were one hundred three (103) different combinations of single and complex interaction and location as labels.

The study participants varied in age from 25 to 35 years and included both genders (six (6) females and twelve (12) males). The participants were free to choose their own method of performing each specific interaction, including a choice of speed and the intensity of each action. Adults were chosen rather than children because it is difficult to collect good quality longitudinal datasets with small children, particularly when it involves data collection involving several repetitions of each interaction. In addition, it has been significantly more challenging to involve small children in studies due to IRB restrictions.

A video camera was positioned and focused on the smart plush toy 10 and the footage was used as ground truth for labeling the data. Each participant went through slightly more than sixteen (16) minutes of study on average. During this time, each participant was asked to perform a series of interactions covering all the 103 labels discussed above. Each interaction was performed during a ten second window with three to four seconds rest in between. The rest time was counted toward idle case. Overall, around 5 hours of data was gathered from the participants while they were interacting with the smart plush toy 10.

The overall classification results are presented first, followed by benchmarks about the individual processing blocks.

Overall Classification Performance

In order to evaluate the effect of cross-talk, classification performance was evaluated for three spatial granularities:

1) Fine-grained—to precisely determine with which of the twenty four sensor locations the interaction is taking place 2) Medium-grained—where some adjacent sensors 14 were merged into one location including: hand and arm on each side, foot and thigh on each side, nose and mouth, forehead and top of the head, and chest and stomach. Other sensors 14 are considered individually. This resulted in the twenty four (24) sensor locations being merged into eight (8) regions of interaction.

3) Coarse-grained—where some groups of sensors 14 were merged and counted as a single group, specifically: (a) both arms i.e., hand and arm on each side; (b) both feet i.e., foot and thigh on each side; (c) head including nose, mouth, cheeks, ears and forehead and top of the head; (d) body including chest, stomach, waist and back. Thus, the coarse-grained groupings transformed the twenty four (24) sensor locations into four (4) coarse groupings.

Figure 8:
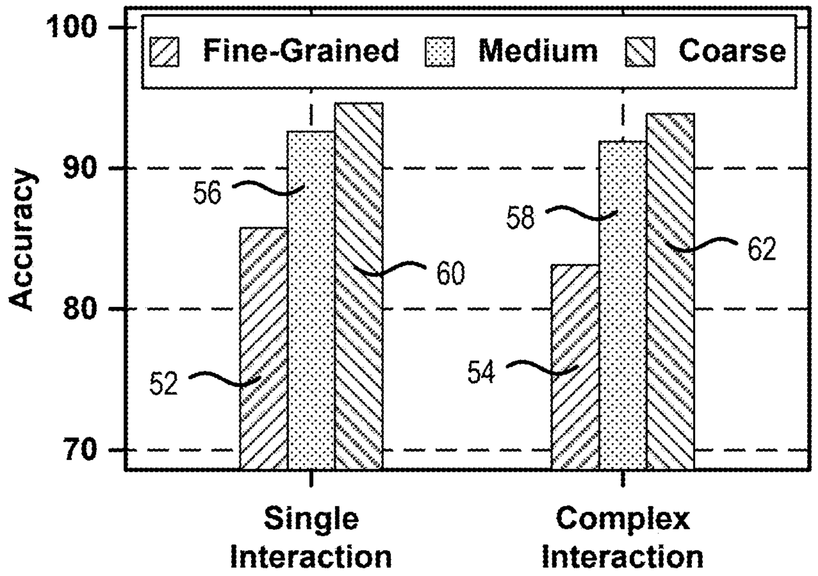
FIG. 8 is a graph of the accuracy of fine-grained, medium-grained, and coarse-grained localization for a single interaction and a complex interaction.

FIG. 8 is a bar graph of the accuracy of the data processing pipeline for each spatial granularity. As can be seen, for precise fine-grained classification, the data processing model was able to achieve about 86% accuracy for single interactions (data bar 52) and about 83% accuracy for complex interactions (data bar 54). As the prediction granularity was progressively coarsened, classification performance increased to about 92% for medium-grained single interactions (data bar 56), to about 91% for medium-grained complex interactions (data bar 58), to about 94% for coarse-grained single interactions (data bar 60), and to about 93% for course-grained complex interactions (data bar 62). Thus, we see that the data processing of the smart plush toy 10 of the present disclosure can be very effective at both fine-grained and coarse-grained classification with increasing performance as the spatial fidelity reduces.

Comparison Against Alternate Models

Performance of the data processing pipeline model of the present disclosure was compared to other well-established machine learning models. Specifically, the data processing model of the present disclosure was compared to: (1) a Multi-Layer Perceptron (MLP) model (such as the model described in Rumelhart et al., "Learning internal representations by error propagation, Technical Report, Univ. California San Diego Inst. for Cognitive Science, September 1985, available at https://apps.dtic.mil/dtic/tr/fulltext/u2/a164453.pdf), which uses features extracted from lightweight convolutional layers which are fed into multiple fully connected layers in the MLP model to compute predictions; (2) the Random Forest model (e.g., as described in Pal, "Random forest classifier for remote sensing classification," Int'l Journal of Remote Sensing, vol. 26, Issue 1, pp. 217-22 (2005), https://doi.org/10.1080/01431160412331269698), which constructs a collections of decision trees and performs an ensemble classification; (3) the xgBoost model (e.g., as described in Chen et al., "XGBoost: A scalable tree boosting system," in Proceedings of the 22nd ACM SIGKDD International Conference on Knowledge Discovery and Data Mining, pp. 785-94 (August 2016), https://doi.org/10.1145/2939672.2939785), which boosts decision trees via applying gradients to correct the previous mistakes and minimize the losses; and (4) the k-Nearest Neighbors model (e.g., as described in Altman, "An introduction to kernel and nearest-neighbor nonparametric regression," The American Statistician, Vol. 46, No. 3, pp. 175-85 (August 1992), https://doi.org/10.1080/00031305.1992.10475879), which deterministically finds k instances in the dataset which are most close to the input data and use the most commonly seen label of the k instance as the label of the input. Each of the comparison models are relatively lightweight and can be executed on a microcontroller-class platform, such as the microcontroller 36 described above for the example smart plush toy 10 described herein. For the other models, raw sensor data was pre-processed to help the other models better capture the time-series contextual information. Histogram density features were then used to map the time-series data from each sensor into a 10-bin histogram. The histogram features (10×48=480) were fed into other machine learning pipelines to train the models.

Figure 9:
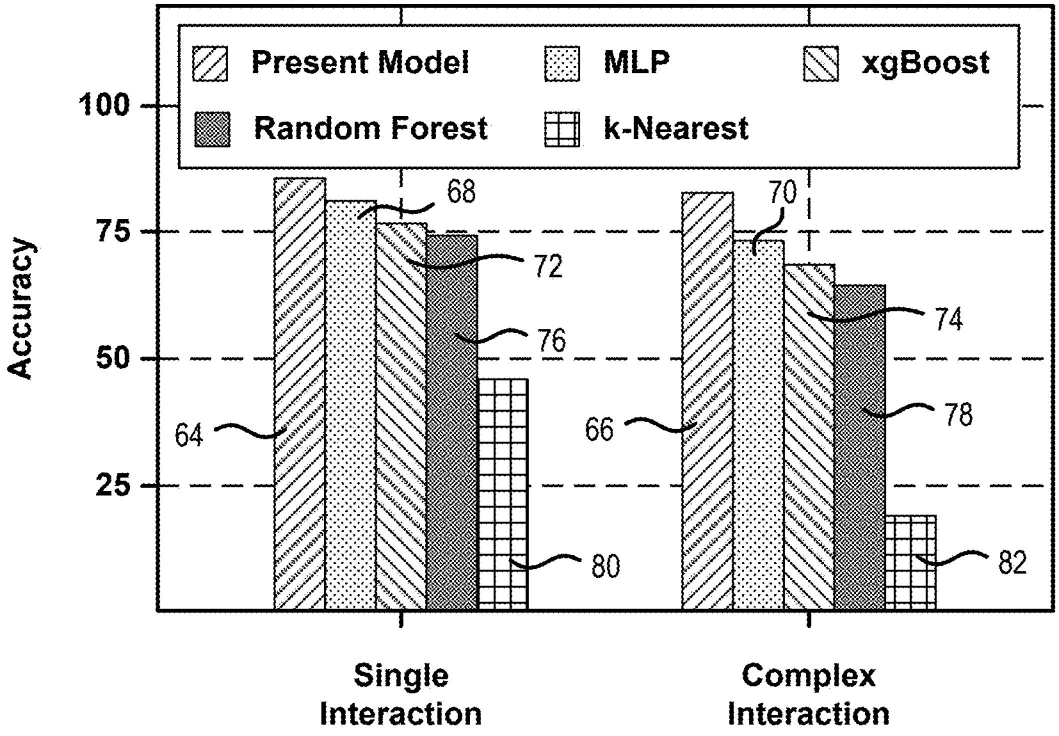
FIG. 9 is a graph of the accuracy of the data analysis method of FIG. 7 compared to other known machine learning models.

FIG. 9 compares the data processing pipeline of the present disclosure (labeled as "Present Model," in FIG. 9) versus the other models for fine-grained classification. As can be seen in FIG. 9, the data processing pipeline model of the present disclosure outperforms all of the other models both for single interactions (about 85% accurate, data bar 64) and complex interactions (about 80% accurate, data bar 66). The data processing pipeline model of the present disclosure appears to achieve more than 5% higher accuracy compared with the MLP model (about 78% accuracy for single interactions, data bar 68, and about 72% for complex interactions, data bar 70) and more than 10% higher accuracy compared with the other three machine learning methods (xgBoost data bar 72 (single interaction) and data bar 74 (complex interaction), Random Forest data bar 76 (single interaction) and data bar 78 (complex interaction), and k-Nearest Neighbors (data bar 80 (single interaction) and data bar 82 (complex interaction)).

Amplified and Non-Amplified Channels

Next, the use of both unamplified data channels 26 and amplified data channels 34 in terms of overall performance was examined. To evaluate this, unamplified signals 26 and non-amplified signals 34 were separately chosen to train the data processing pipeline model of the present disclosure and check the performance against a comparative combined version using both data streams. For the amplified-only and unamplified only cases, the data processing pipeline model was modified so that it could accept input signals that are half the size.

Figure 10:
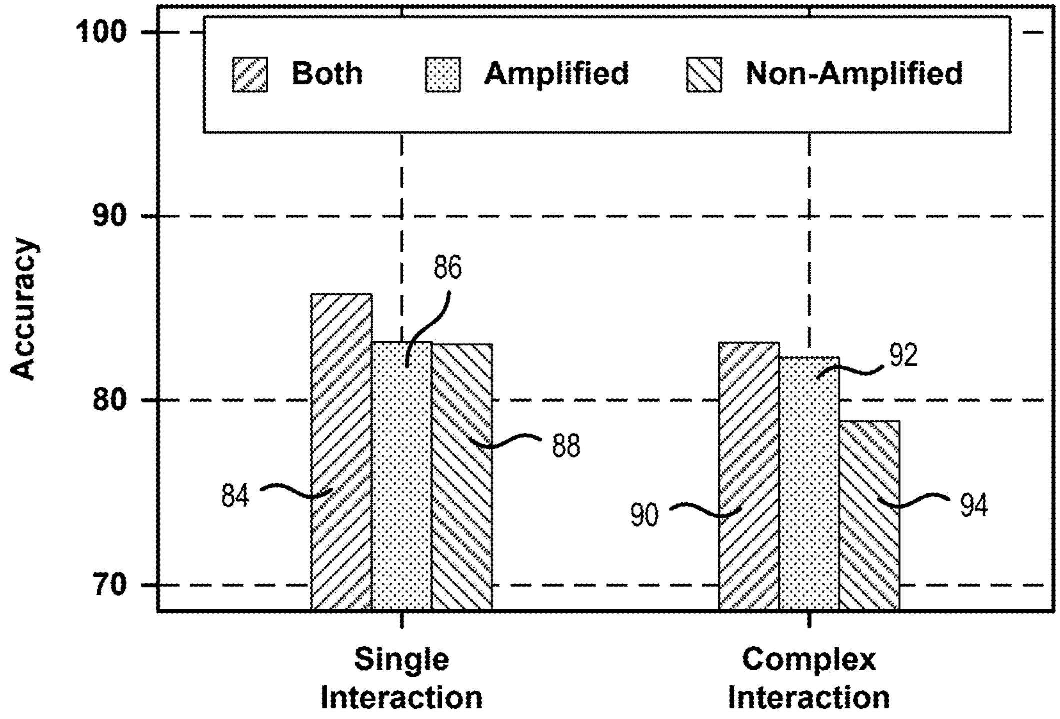
FIG. 10 is a graph showing a breakdown of the contribution of amplified and non-amplified channels to overall data analysis accuracy.

FIG. 10 is a bar graph of the accuracy when both data streams are used compared to that of the amplified signal alone and the unamplified signal alone. As can be seen in FIG. 10, the combination of amplified and non-amplified signals provides more information for the machine learning model compared with either signal separately. For single interactions, using both streams (data bar 84) provides for a 3-4% improvement in accuracy over using the amplified stream alone (data bar 86) or the unamplified data stream alone (data bar 88). For complex interactions, using both streams (data bar 90) provides a 1-5% improvement over using the amplified data stream alone (data bar 92) or the unamplified data stream alone (data bar 94). FIG. 10 also shows the importance of generating amplified versions of the base channels.

Early Exit

While the Feature Extractor layers are common to the local and remote models, the use of early exit blocks is specific to the local model, as described above. The early exits allows the data processing pipeline model to bypass a portion of the neural network by leveraging intermediate exit points.

Figure 11A:
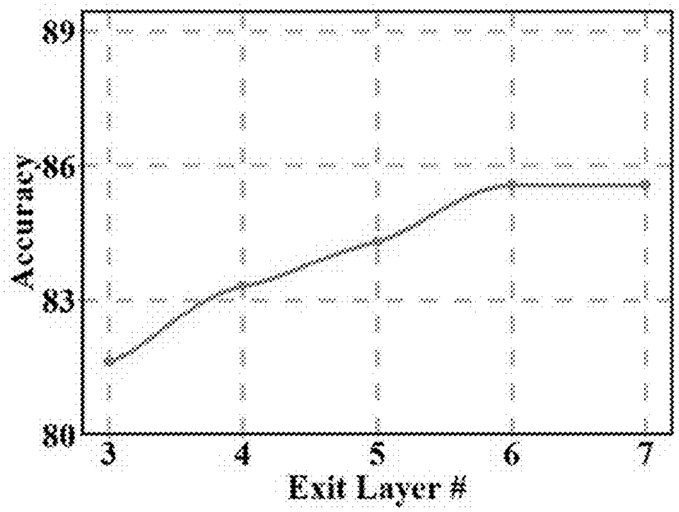
FIGS. 11A-11C are graphs showing the effect of adjusting early exit layer number on the system's data analysis accuracy, processing power consumption, and processing latency.
Figure 11B:
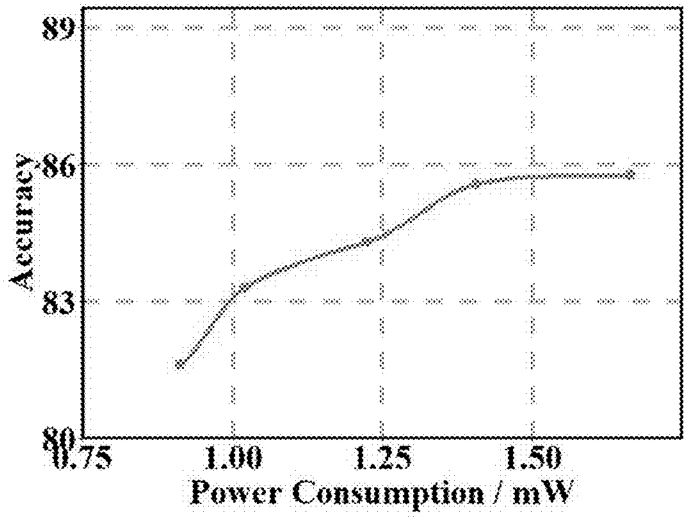
Figure 11C:
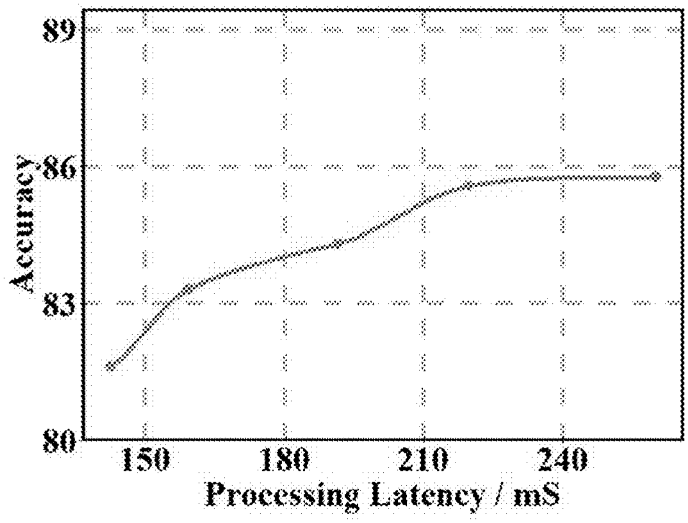

The effect of early exit was studied for its effect on overall model accuracy (FIG. 11A), model power consumption (FIG. 11B), and latency on the microcontroller (FIG. 11C). These plots were calculated based on the datasheet for the nRF52840 microcontroller using active CPU power and runtime for each early exit route.

As can be seen in FIGS. 11A-11C, early exit at layer 3 reduces accuracy by about 4% but has around eight times better computation energy efficiency and latency compared to executing the full model. Early exits at intermediate layers between these ends provide progressively better accuracy but offer less gains in performance. Thus, early exit has significant advantages in terms of overall performance.

Adaptive Aggregation

Figure 12:
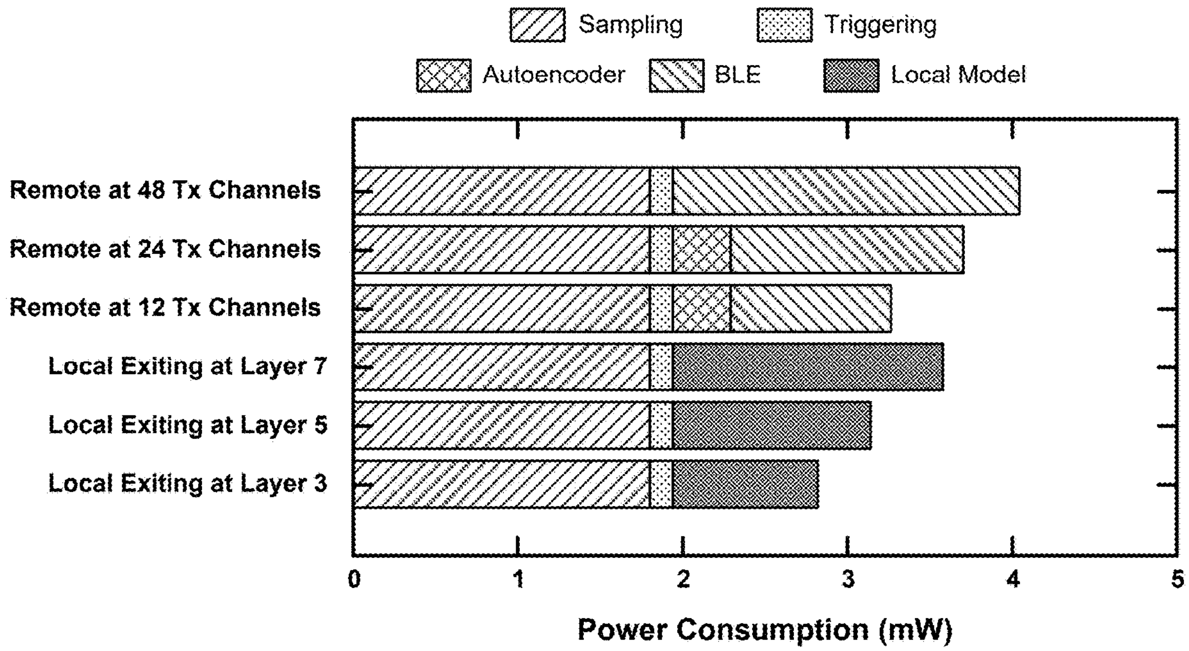
FIG. 12 is a graph showing a breakdown of processing power consumption in various scenarios of data analysis.

Data dimensionality reduction by adaptive aggregation was employed for the remote model. The performance of this module was analyzed. The benchmark for the module was produced using the Nordic Online Power Profiler for BLE. The numbers roughly agree with the empirical power breakdown figure as well, which is shown in FIG. 12.

Comparison of Local and Remote Processing

Figure 13:
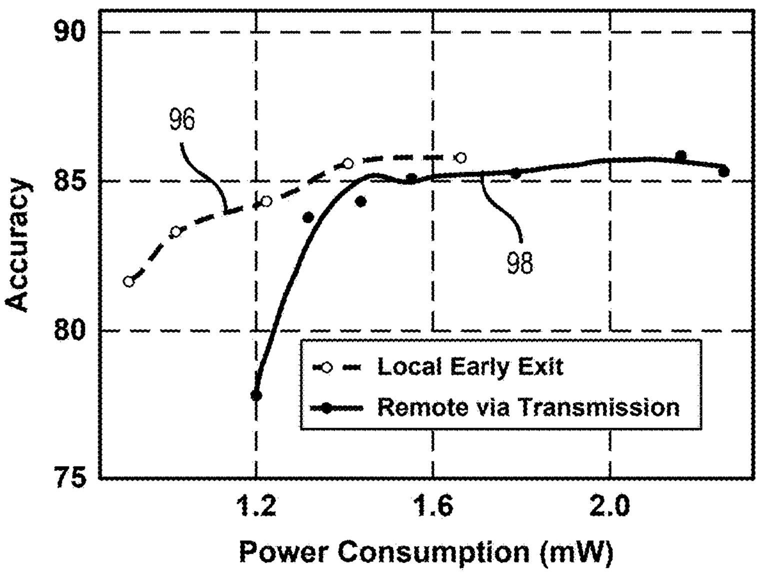
FIG. 13 is a graph showing the effect of local versus remote processing models for the microcontroller.

Having analyzed the local and remote branches of the data processing pipeline of the present disclosure, the performance of each branch of the pipeline can be compared. FIG. 13 is a graph of the accuracy of each branch as a function of power consumption. As can be seen in FIG. 13, the local branch of the data processing pipeline (data series 96) is generally more energy efficient than the remote branch (data series 98). This is unsurprising since the radio 38 consumes more power than the microcontroller 36, and because the early exit blocks reduce energy consumption for the local branch. However, the gap narrows in the regime where higher accuracies are desirable since the remote branch is able to take advantage of more complex models being used on the remote device. Those having skill in the art will also appreciate that the choice between local and remote processing may be to enable specific applications rather than power consumption. From this perspective, the main takeaway is that both methods are viable at low power.

Figure 14A:
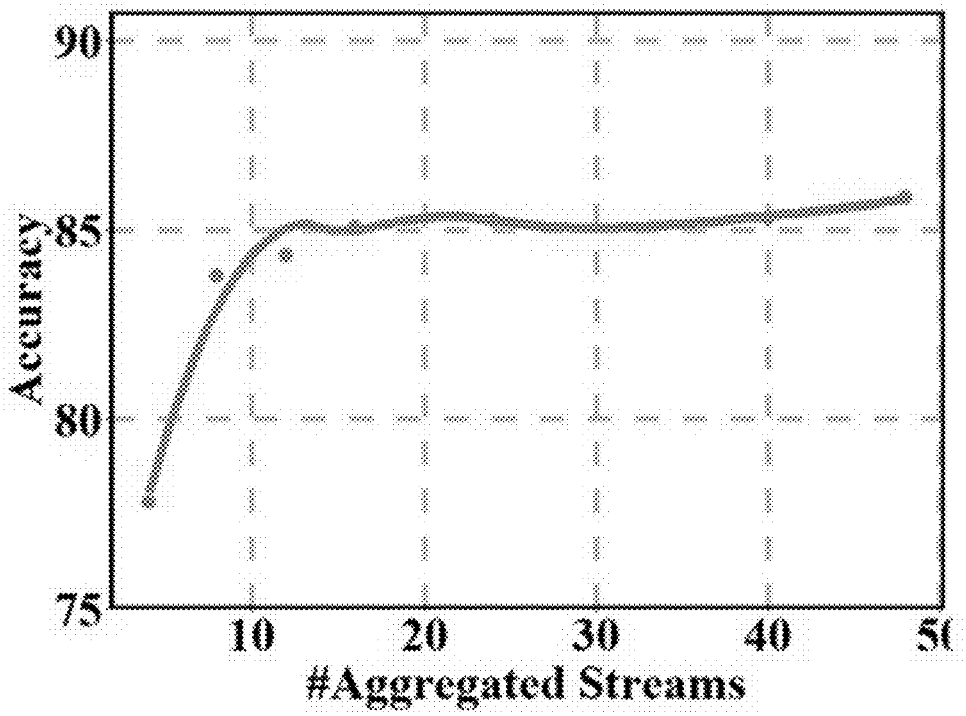
FIGS. 14A and 14B are graphs showing the effect of the number of data streams being transmitted on the system's data analysis accuracy and power consumption.
Figure 14B:
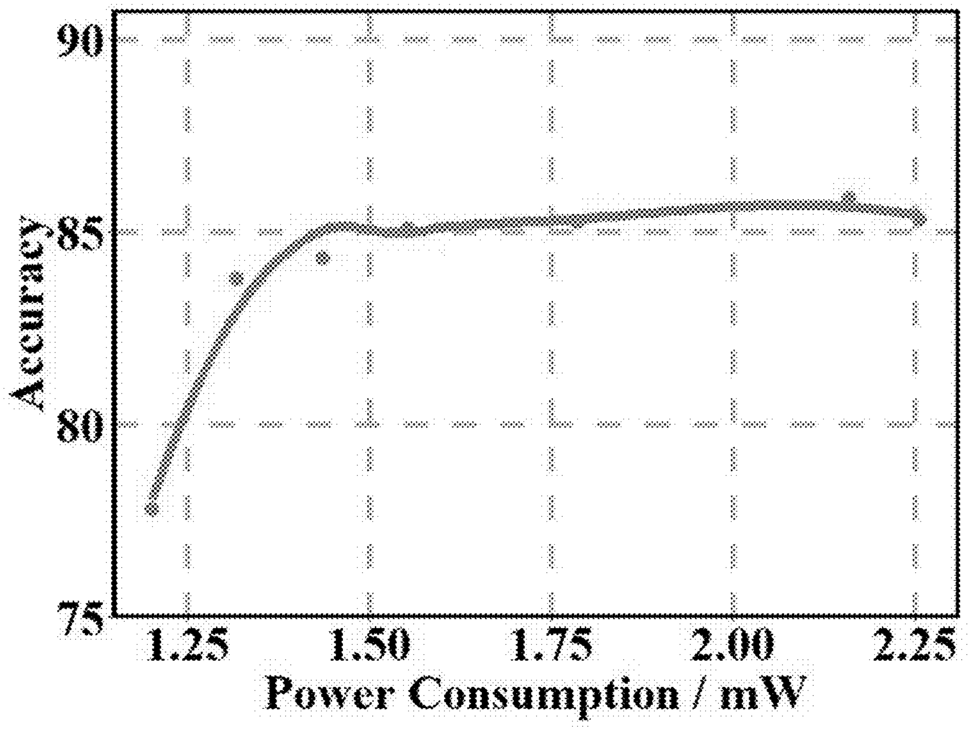

FIGS. 14A and 14B illustrate the trade-off between the number of data streams being transmitted and the model's accuracy and power consumption, respectively. As can be seen by FIGS. 11A and 11B, the accuracy rapidly increases until about 10 streams, and then plateaus. Knowledge of this relationship allows for reduction of transmission power consumption by about two times compared to a system that transmits all the channels with no compression.

Execution Latency of Local Data Processing Model

A breakdown of execution latency of the data processing pipeline model of the present disclosure on both the nRF52811 microcontroller 36 described above as well as on other low-power embedded devices was performed. The other devices tested were: (a) the IoT application processor sold under the trade name GAP8 by GreenWaves Technologies SAS (Grenoble, France); (b) the processor sold under the trade name Raspberry Pi 4B by the Raspberry Pi Foundation (Cambridge, UK); and (c) the computing device sold under the trade name Jetson TX2 by NVIDIA Corp. (Santa Clara, CA, USA). The computing ability of each device can vary widely depending on their power needs. For example, the GAP8 processor can execute the deep learning models with a core frequency of 50 MHz and power consumption of 25 mW, while the power consumption of the Raspberry Pi 4B device is around 1.5 W and the power consumption of the Jetson TX2 device is around 7.5 W. We uses the system clock in Linux and the hardware cycle counters in the GAP8 device were used to estimate the execution latency for each layer of the data processing pipeline model of the present disclosure. The model of the present disclosure was executed multiple times and the average execution latency per layer was measured.

Figure 15:
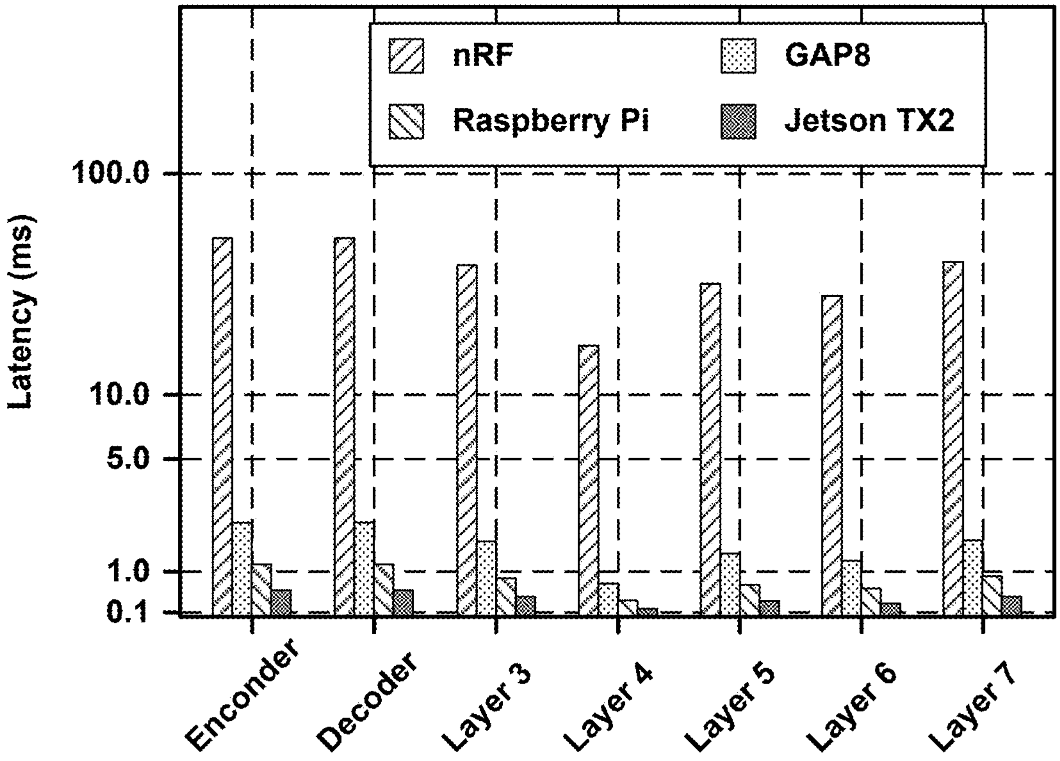
FIG. 15 is a graph of latency of different layers of the data processing pipeline of FIG. 7.

FIG. 15 shows the latency of different layers in the data processing pipeline on the example microcontroller used for the smart plush toy of the present disclosure (e.g., the nRF52811 microcontroller). As expected, the nRF52811 microcontroller takes longer than the other devices tested to perform the operations. The overall average latency for local processing is about 260 milliseconds (ms). This gives the processor enough time to sleep between each two calculations, which take place every one second.

Power Benchmarks

FIG. 12 shows the processing power consumption breakdown for the data processing pipeline of the present disclosure across the different blocks. Since power consumed for the remote model depends on the number of channels transmitted and power for the local model depends on the early exit point, numbers were provided for three different channel aggregation values and three different early exit points.

Overall, the data processing pipeline of the present disclosure consumed from about 2.9 mW to about 4 mW depending on the number of channels transmitted or the early exit point. This amount of power consumption corresponds to more than a month of operation on a small 950 mAh rechargeable battery (e.g., with a 3 cm×5 cm footprint) before the battery needs recharging.

It is noted that a significant fraction of the power is consumed by the sampling block. This is the case since sampling of each channel is performed at 160 Hz to remove powerline noise, hence the system overall is sampling at 7.68 kHz. However, optimizing the sampling subsystem was not a focus of the work that led to the present disclosure, but the inventors expect that this can be optimized with better hardware design. The triggering block can also improve efficiency if done in analog before the microcontroller is turned on.

Finally, it is noted that since the electronics board 20 and battery can be placed inside the toy, they can be physically isolated using waterproof packaging and as a result, the battery capacity can be increased to allow for months of operation per full charge.

Discussion

In the design of the smart plush toy 10, the inventors encountered several roadblocks and opportunities for future work. These issues are briefly discussed below.

Multi-Toy Interaction

One exciting opportunities presented by the smart plush toy 10 of the present disclosure is the detection of a much richer set of interactions with soft toys. The study described above only included interaction with a single smart plush toy 10, but the inventors believe that the work can be extended to even richer set of interactions with more than one toy 10. This can involve more complex storytelling applications that involve interaction with different toys that play different roles in the story. While such multi-toy interaction with smart toys can be enabled by presently-available technology, the inventors believe that an advantage in the approach of the smart plush toy 10 described herein is the naturalistic feel for the smart toy 10 and the potential that it makes play with the smart toys 10 more engaging for children.

Sensing and Actuation

While the system of the smart plush toy 10 described herein focused on dense sampling of interactions with the plush toy 10, there are many opportunities that could be opened up if the interaction sensing described herein can be paired with other modalities, such as audio to expand the vocabulary of interaction or actuation of one or more structures of the toy 10 in response to an interaction or to prompt an interaction. For example, because of significant advances in natural language understanding and dialog, the sensing of the smart plush toy 10 described herein can potentially be paired with more sophisticated audio-based dialog methods to enhance how children interact with smart toys 10.

Dynamics in Natural Environments

We have designed, implemented, and analyzed an interaction-aware toy 10 and validated the performance in semi-stationary scenarios. However, there may also be a broader range of interactions in the natural environment, for example, a user can interact with a toy 10 during walking. This can create new signal dynamics as walking causes vibrations all over the toy 10, which may be seen by all the channels. Such global actions can complicate the interaction detection process as the signal caused by the walking may drown some desired signals such as weaker tickling. To deal with this potential issue, the data processing pipeline may add active motion artifact canceling methods where an algorithm detects walking by distinguishing the vibrations in most of the sensors with similar rhythm, and recreates the motion signal and subtracts it from the original.

As described above, the present disclosure describes a smart plush toy 10 that includes an end-to-end platform for detecting and localizing user interactions with the plush toy 10 in a fine-grained real-time manner. The design can address a number of challenges including ensuring unobtrusiveness and natural look and feel while still achieving high signal quality, high spatio-temporal fidelity, as well as low power operation. Optimizations across the hardware-software stack—including a highly optimized array of fabric sensors 14, low-power signal conditioning and acquisition (e.g., with the electronics board 20 integrated within the toy 10), and low-power embedded machine learning and data compression (which can be integrated into a microcontroller 26 integrated with the toy 10 or by an external computing device in communication with the toy 10, such as a smartphone 44 or a personal computer 46). Evaluation of the hardware and data processing pipeline shows that the system can enable accurate detection across a range of simple and complex interactions across the entire surface of the toy 10. Overall, the smart plush toy 10 offers a very promising path forward for interaction detection and processing and has significant potential to enable a new class of interactive toys for kids.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A plush toy system comprising:

a plush toy body with an outer fabric layer, wherein the outer fabric layer forms an interactive surface engageable by a user;

an array of textile-based pressure sensors coupled to the outer fabric layer, wherein at least one of the textile-based pressure sensors comprises a sheet-like textile-based layer with a functionalized coating comprising an ion-conductive material including one or more counterions deposited on the sheet-like textile-based layer, wherein the one or more counterions act as an ion conductor through the sheet-like textile-based layer, a surface resistivity of the functionalized coating is proportional to a surface concentration of the one or more counterions on the ion-conductive material, and the surface concentration of the one or more counterions changes in response to a pressure being applied to the at least one of the textile-based pressure sensors so that the at least one of the textile-based pressure sensors provides a corresponding signal proportional to the pressure being applied to the at least one of the textile-based pressure sensors; and sensor conditioning circuits coupled to the plush toy, the sensor conditioning circuits being configured to interpret the corresponding signals from the textile-based pressure sensors to identify interaction between the user and the interactive surface.

2. The plush toy system of claim 1, wherein at least a portion of the textile-based pressure sensors are coupled behind the outer fabric layer in an interior of the plush toy body.

3. The plush toy system of claim 1, wherein the sensor conditioning circuits comprise first and second sensor channels for each corresponding textile-based pressure sensor in the array, wherein the first sensor channel analyzes unamplified signals from the corresponding textile-based pressure sensor for interaction at or above a first pressure and the second sensor channel analyzes amplified signals from the corresponding textile-based pressure sensor for interaction at or below a second pressure that is lower than the first pressure.

4. The plush toy system of claim 1, wherein the sensor conditioning circuits comprise a processor that is configured to process signals from the textile-based pressure sensors of the array, wherein processing of the signals by the processor comprises a local feature extractor configured to extract features from sensor data to identify what interaction may have taken place with one or more of the textile-based pressure sensors of the array.

5. The plush toy system of claim 4, wherein the local feature extractor comprises a plurality of local neural networking processing layers.

6. The plush toy system of claim 1, wherein the plush toy body further comprises a communication device, wherein the communication device is configured to communicate with an external computing device.

7. The plush toy system of claim 6, wherein the external computing device comprises a remote feature extractor configured to extract features from sensor data from the textile-based pressure sensors that have been communicated to the external computing device via the communication device, wherein the external computing device is configured to determine what interaction may have taken place with one or more of the textile-based pressure sensors of the array based on the features extracted by the remote feature extractor.

8. The plush toy system of claim 1, wherein the at least one of the textile-based pressure sensors comprises:

a pair of first textile-based outer layers each having an electrical resistance of no more than 100 ohms, and a textile-based inner layer sandwiched between the pair of first textile-based outer layers, wherein the textile-based inner layer comprises the sheet-like textile-based layer with the functionalized coating.

9. The plush toy system of claim 1, wherein the sheet-like textile-based layer comprises a plurality of fibrous structures combined to form a woven or non-woven fabric layer, wherein the functionalized coating is coated on the plurality of fibrous structures of the woven or non-wave fabric layer.

10. The plush toy system of claim 9, wherein the woven or non-wave fabric layers comprises an off-the-shelf woven or non-woven fabric.

11. The plush toy system of claim 1, wherein the at least one of the textile-based pressure sensors is sewn to the outer fabric layer of the plush toy body.

12. A method comprising:

providing or receiving a plush toy, wherein the plush toy comprises:

an outer fabric layer that forms an interactive surface engageable by a user; and an array of textile-based pressure sensors coupled to the outer fabric layer, wherein at least one of the textile-based pressure sensors comprises a sheet-like textile-based layer with a functionalized coating comprising an ion-conductive material including one or more counterions deposited on the sheet-like textile-based layer, wherein the one or more counterions act as an ion conductor through the sheet-like textile-based layer, a surface resistivity of the functionalized coating is proportional to a surface concentration of the one or more counterions on the ion-conductive material, and the surface concentration of the one or more counterions changes in response to a pressure applied to the at least one of the textile-based pressure sensors so that the at least one of the textile-based pressure sensors provides a corresponding signal proportional to the pressure being applied to the at least one of the textile-based pressure sensors; and processing the corresponding signals from the array of textile-based pressure sensors to identify an interaction between the user and the interactive surface.

13. The method of claim 12, wherein the processing of the corresponding signals comprises:

splitting each corresponding signal into an unamplified first signal portion and an unamplified second signal portion;

amplifying the unamplified second signal portion to provide an amplified signal;

analyzing the unamplified first signal portion to identify interaction at or above a first pressure;

analyzing the amplified signal to identify interaction at or below a second pressure that is lower than the first pressure.

14. The method of claim 12, wherein the processing of the corresponding signals comprises a processor extracting features from the corresponding signals to identify what interaction may have taken place with one or more of the textile-based pressure sensors of the array.

15. The method of claim 14, wherein the processor comprises a plurality of neural processing layers, wherein extracting of the features from the corresponding signals is performed by the plurality of neural networking processing layers.

16. The method of claim 15, wherein each neural networking processing layer comprises a one-dimensional convolution layer followed by a batch normalization block and a rectified linear unit.

17. The method of claim 15, further comprising an early exit after one or more of the neural networking processing layers.

18. The method of claim 12, wherein the plush toy comprises a communication device configured to communicate with an external computing device.

19. The method of claim 12, wherein the sheet-like textile-based layer comprises a plurality of fibrous structures combined to form a woven or non-woven fabric layer, wherein the functionalized coating is coated on the plurality of fibrous structures of the woven or non-wave fabric layer.

* * * * *